United States Patent
Imoto et al.

(10) Patent No.: US 9,764,961 B2
(45) Date of Patent: Sep. 19, 2017

(54) CYCLOHEXASILANE

(71) Applicant: NIPPON SHOKUBAI CO., LTD., Osaka (JP)

(72) Inventors: Shin-ya Imoto, Osaka (JP); Takashi Abe, Osaka (JP); Morihiro Kitamura, Osaka (JP); Hikaru Takahashi, Osaka (JP); Takehiko Morita, Osaka (JP); Tatsuhiko Akiyama, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 15/437,845

(22) Filed: Feb. 21, 2017

(65) Prior Publication Data

US 2017/0158518 A1 Jun. 8, 2017

Related U.S. Application Data

(63) Continuation of application No. 14/138,764, filed on Dec. 23, 2013, now Pat. No. 9,617,161.

(30) Foreign Application Priority Data

Dec. 25, 2012 (JP) .................. 2012-281489
Sep. 6, 2013 (JP) .................. 2013-185100

(51) Int. Cl.
  *C01B 33/04* (2006.01)
  *B01D 3/12* (2006.01)
  *B01D 1/22* (2006.01)

(52) U.S. Cl.
  CPC .............. *C01B 33/046* (2013.01); *B01D 1/22* (2013.01); *B01D 3/12* (2013.01); *C01B 33/04* (2013.01); *C01P 2006/80* (2013.01)

(58) Field of Classification Search
  CPC .................................................. C01B 33/04
  USPC ........................................................ 423/347
  See application file for complete search history.

(56) References Cited

U.S. PATENT DOCUMENTS

| | | | |
|---|---|---|---|
| 5,942,637 A | 8/1999 | Boudjouk et al. | |
| 2002/0076378 A1 | 6/2002 | Wolfe et al. | |
| 2003/0229190 A1 | 12/2003 | Aoki | |
| 2006/0222583 A1 | 10/2006 | Hazeltine | |
| 2012/0024223 A1 | 2/2012 | Torres | |

FOREIGN PATENT DOCUMENTS

| | | |
|---|---|---|
| JP | 4519955 | 8/2010 |
| JP | 2013-95697 | 5/2013 |
| JP | 2013-233961 | 11/2013 |

OTHER PUBLICATIONS

Hengge et al., "Preparation of Cyclohexasilane, $Si_6H_{12}$", Angew. Chem. Int. Ed. Engl., vol. 16, No. 6, 1977, p. 403.
Taiwanese Office Action issued Dec. 5, 2016 in corresponding Taiwanese Application No. 102147901, with English translation.
Schulz et al., "$Si_6H_{12}$/Polymer Inks for Electrospinning a-Si Nanowire Lithium Ion Battery Anodes", Electrochemical and Solid-State Letters, 2010, vol. 13, No. 10, pp. A143-A145.
Office Action issued May 9, 2017 in corresponding Japanese Application No. 2013-265212, with English Translation.

*Primary Examiner* — Edward Johnson
(74) *Attorney, Agent, or Firm* — Wenderoth, Lind & Ponack, L.L.P.

(57) ABSTRACT

High purity cyclohexasilane and a method for increasing the purification efficiency thereto are provided. The method for producing cyclohexasilane of the present invention is characterized in that, in distilling crude cyclohexasilane to obtain purified cyclohexasilane, the absolute pressure during distillation is set to 2 kPa or less, and the heating temperature of crude cyclohexasilane is set to 25 to 100° C. The cyclohexasilane of the present invention contains pure cyclohexasilane at a rate of 98% by mass or more and 100% by mass or less.

8 Claims, 3 Drawing Sheets

CYCLOHEXASILANE

BACKGROUND OF THE INVENTION (1) Field of the Invention

The present invention relates to a method for efficiently producing a silicon hydride compound represented by cyclohexasilane in high purity, high purity cyclohexasilane that can be obtained thereby, a method for maintaining the purity of a silicon hydride compound such as a method for storing a silicon hydride compound and a method for cleansing an apparatus for a silicon hydride compound, and a method for treating an exhaust gas that allows a gas produced in a facility that handles a silicon hydride compound to be efficiently and safely exhausted.

(2) Description of Related Art

A silicon thin film is used for applications to solar cells, semiconductors and the like, and this silicon thin film has been conventionally prepared by a vapor deposition film-forming method (CVD method) using monosilane as a raw material. Recently, in place of the CVD method, a new production method using cyclic silicon hydride has been focused. This production method is a coating film-forming method (liquid process) in which a polysilicon hydride solution is applied to a substrate and then the substrate is subjected to calcination, and cyclopentasilane is used as a preparation raw material for the polysilicon hydride solution. Cyclopentasilane is commercially available, and has been reported to be polysilicon hydride by UV irradiation. However, cyclopentasilane requires multi-step synthesis using an expensive water-reactive reagent and a purification step for its production, and thus is very expensive.

Therefore, the present inventors have focused on cyclohexasilane as an alternate material for cyclopentasilane. As a method for synthesizing a silicon hydride compound represented by cyclohexasilane, it is known that it can be synthesized by an older known method of undergoing processes of cyclization, halogenation, and reduction, using diphenyldichlorosilane as a source (Hengge method, Angew. Chem. Int. Ed. Engl., 1977, 16, 403), a method of synthesizing a dianion complex using trichlorosilane and polyamine, and reducing this dianion complex (Japanese Patent No. 4519955), a method of reacting halosilane and an ammonium salt to obtain a cyclic silane intermediate, and reducing this cyclic silane intermediate (JP-A-2013-95697), and the like.

SUMMARY OF THE INVENTION

In the silicon hydride compound, particularly cyclohexasilane, the potential use in the semiconductor field and battery field are increased, and it is necessary to prepare a high-purity product by purification, but a method for purifying a silicon hydride compound has been hardly known.

The present inventors have attempted to purify cyclohexasilane, but the purification efficiency of cyclohexasilane is very low, and it is difficult to purify cyclohexasilane with high efficiency. Specifically, when cyclohexasilane is purified by distillation, the purification efficiency cannot be increased even though purified at a low temperature and even though purified at a high temperature. For example, when cyclohexasilane is distilled at a low temperature, not only the evaporation rate is low, but also the temperature of a condenser is necessary to be low in order to certainly condense vaporized cyclohexasilane, thus a solidified matter is likely to adhere to the condenser to produce obstruction, and the purification efficiency is poor. Also, when cyclohexasilane is distilled at a high temperature, distillation stops in the midst, and the purification efficiency is poor as well.

Incidentally, cyclohexasilane has been so far produced by a small amount at a laboratory level, thus the obtained cyclohexasilane is usually stored in a reagent bottle or the like, or subsequently used in the next step (silicon film formation or the like). However, in the future, in the fields of solar cells and semiconductors, once a higher order silicon hydride compound having a plurality of silicon atoms in a molecule like cyclohexasilane is increasingly demanded, and mass-produced, it is expected that a high-purity product is necessary to be stored in a container over a long period.

However, cyclohexasilane has spontaneous combustion characteristics that reacts with oxygen in the air when comes into contact with air and spontaneously ignites, and is oxidized to produce a siloxane compound as an impurity. Also, cyclohexasilane easily reacts with water, thus hates dampness. Furthermore, cyclohexasilane is ring-opening polymerized by light and heat, and the purity is reduced. When cyclohexasilane having such properties is stored in a container, various designs such as high airtightness are required for a storage container.

For example, a monosilane also having spontaneous combustion characteristics is gaseous at normal temperature and normal pressure, thus can be stored in a common gas cylinder as used for propane gas and the like. However, cyclohexasilane is liquid at normal temperature and normal pressure, thus cannot be stored in a gas cylinder.

Based on these facts, the present inventors have been accomplished an invention relating to an airtight container suitable for storage of a silicon hydride compound like cyclohexasilane, and already filed an application (Japanese Patent Application No. 2012-107021). However, a description relating to a specific method such that, under what conditions a silicon hydride compound put in an airtight container should be stored, or how a silicon hydride compound should be enclosed in an airtight container in an industrial production process, has been insufficient.

In addition, while mixing of impurities has to be avoided as much as possible, considering application of a silicon hydride compound to the semiconductor field, a method of cleansing an apparatus used for synthesis and preservation of a silicon hydride compound has never been studied. The silicon hydride compound reacts with oxygen and water to produce a siloxane-based compound, and this adheres to an apparatus for a silicon hydride compound and remains as a stain, subsequently may become impurities when synthesis and preservation are carried out, and cause lowering of purity of the silicon hydride compound.

Furthermore, in a facility that handles a cyclic silane compound such as cyclopentasilane or cyclohexasilane or a chain silicon hydride compound, a gas containing a silicon hydride compound such as monosilane or a halogenated silane compound such as trichlorosilane is generated, as a by-product in the synthesis or purification, or as a degradation product of a cyclic silane compound or chain silicon hydride compound produced during storage or the like. Furthermore, a cyclic silane compound or chain silicon hydride compound itself may vaporize to produce gas, in the purification, during storage or the like, or a cyclic silane compound or chain silicon hydride compound used as a raw material when forming a film with a CVD apparatus or the like may be exhausted unreacted. As described above, in the gas produced in a facility that handles a cyclic silane compound or a chain silicon hydride compound, a silicon hydride compound having explosive properties and susceptibility to burn (especially, a silicon hydride compound having 1 to 6 Si atoms), a halogenated silane compound or a cyclic silane compound is contained. Therefore, the gas produced in a facility that handles a cyclic silane compound or a chain silicon hydride compound is diluted to the predetermined silane concentration (self-ignition concentration) or less with an inert gas such as nitrogen, and exhausted into the atmosphere. However, a silicon hydride compound, a halogenated silane compound or a cyclic silane compound is harmful to the human body and environment, thus is expected to be not only diluted but also removed itself, from the viewpoint of safety.

The present invention has been made by focusing on the situation as described above, and an object of the present invention is to find a purification method for providing a high purity silicon hydride compound applicable to the semiconductor field and battery field, and provide high purity cyclohexasilane with good purification efficiency. In addition, another object of the present invention is to provide cyclohexasilane having high stability with time. Furthermore, in the present invention, providing a storage method for stably storing a silicon hydride compound without deteriorating the silicon hydride compound, providing a method for efficiently and safely cleansing an apparatus for a silicon hydride compound, and providing a method for treating an exhaust gas that allows a gas produced in a facility that handles a cyclic silane compound or a chain silicon hydride compound to be efficiently and safely exhausted into the atmosphere are cited as the problems. Here, in the present invention, various problems are cited regarding handling of a high purity silicon hydride compound and the like, as described above. However, one that can solve all these problems is not only the present invention, and it is only necessary to solve at least one of these objects in the present invention.

DETAILED DESCRIPTION OF THE PREFERRED EMBODIMENTS

As a result of the extensive studies to solve the above problems, the present inventors have ascertained that there specifically exist the pressure range and temperature range in which the purification efficiency of cyclohexasilane is improved. Then, the present inventors have found that, when crude cyclohexasilane is distilled at least under an absolute pressure of 2 kPa or less and the temperature affecting to crude cyclohexasilane during distillation is controlled in a specific range, obstruction of the condenser and suspension of distillation can be avoided, and the purification efficiency of cyclohexasilane is increased, and the like, whereby the present invention is accomplished.

More specifically, the first cyclohexasilane of the present invention contains pure cyclohexasilane at a rate of 98% by mass or more and 100% by mass or less. In the present invention, "pure cyclohexasilane" refers to cyclohexasilane with a purity of 100%. Accordingly, when the cyclohexasilane of the present invention contains pure cyclohexasilane at a rate of less than 100% by mass, the cyclohexasilane of the present invention is a composition containing pure cyclohexasilane and impurities.

In the preferred embodiment of the first cyclohexasilane of the present invention, a dimer of cyclohexasilane is contained at a rate of 2% by mass or less.

On the other hand, in the second cyclohexasilane of the present invention, the content of a metal element is 0.01 to 100 ppb.

The method for producing cyclohexasilane of the present invention is characterized in that, in distilling crude cyclohexasilane to obtain purified cyclohexasilane, the absolute pressure during distillation is set to 2 kPa or less, and the heating temperature of crude cyclohexasilane is set to 25 to 100° C.

The method for producing a silicon hydride compound of formula (1):

$$(SiH_2)_n \quad (1)$$

wherein n is 3 to 6, or a silicon hydride compound of formula (2):

$$Si_mH_{2m+2} \quad (2)$$

wherein m is 3 to 6, of the present invention is characterized to comprising:

subjecting a crude silicon hydride compound to distillation at least two times, steps of which distillation are carried out under different conditions.

The method for storing a silicon hydride compound of the present invention is characterized in that a silicon hydride compound of formula (1):

$$(SiH_2)_n \quad (1)$$

wherein n is 3 to 6, or a silicon hydride compound of formula (2):

$$Si_mH_{2m+2} \quad (2)$$

wherein m is 3 to 6, is stored at 40° C. or less in a storage container in which an inert gas with an oxygen concentration of 100 ppm or less and a moisture amount of 100 ppm or less is enclosed.

The method for cleansing an apparatus brought into contact with at least one of a silicon hydride compound of formula (1):

$$(SiH_2)_n \quad (1)$$

wherein n is 3 to 6, and a silicon hydride compound of formula (2):

$$Si_mH_{2m+2} \quad (2)$$

wherein m is 3 to 6, of the present invention is characterized to comprising:

a first cleansing step that washes with an aprotic solvent,
a second cleansing step that washes with a solution containing an alkaline compound in an alcohol, and
a third cleansing step that washed with water having an electric conductivity at 25° C. of 1 μS/cm or less.

The method for treating an exhaust gas of the present invention is characterized in that, in exhausting a gas produced in a facility that handles a cyclic silane compound or a silicon hydride compound of formula (2):

$$Si_mH_{2m+2} \quad (2)$$

wherein m is 3 to 6, one or more silane components selected from the group consisting of $SiH_4$, $Si_2H_6$, $Si_3H_8$, $Si_4H_{10}$, $Si_5H_{12}$, $Si_6H_{14}$ and cyclic silane compounds in the gas are detoxified. In the present invention, detoxification refers to reduce the explosive properties and susceptibility to burn of an exhaust gas, and also decompose a silicon hydride compound (especially, a silicon hydride compound having 1 to 6 Si atoms), a cyclic silane compound or a halogenated silane compound, to make it harmless to the human body and environment.

According to the method for producing cyclohexasilane of the present invention, the pressure and heating temperature in the distillation are set in the predetermined ranges, whereby obstruction of the apparatus and suspension of distillation can be avoided, and high purity cyclohexasilane can be obtained with good purification efficiency.

According to the method for producing a silicon hydride compound of the present invention, distillation under specific conditions is carried out twice or more, whereby a high purity silicon hydride compound having good temporal stability with extremely low impurities can be obtained in a good yield.

According to the method for storing a silicon hydride compound of the present invention, the oxygen concentration and the moisture amount are set to the specific amount or less, at the specific temperature or less, whereby a silicon hydride compound can be stored for a long period while maintaining high purity.

According to the method for cleansing an apparatus for a silicon hydride compound of the present invention, an apparatus for a silicon hydride compound can be efficiently and safely washed. The apparatus for a silicon hydride compound after cleansing is a highly cleaned apparatus that in which generation of impurities is suppressed, and the purity of a silicon hydride compound is not lowered.

According to the method for treating an exhaust gas of the present invention, a gas produced in a facility that handles a cyclic silane compound or a specific silicon hydride compound can be efficiently and safely exhausted into the atmosphere.

DETAILED DESCRIPTION OF THE PREFERRED EMBODIMENTS

Figure 1:
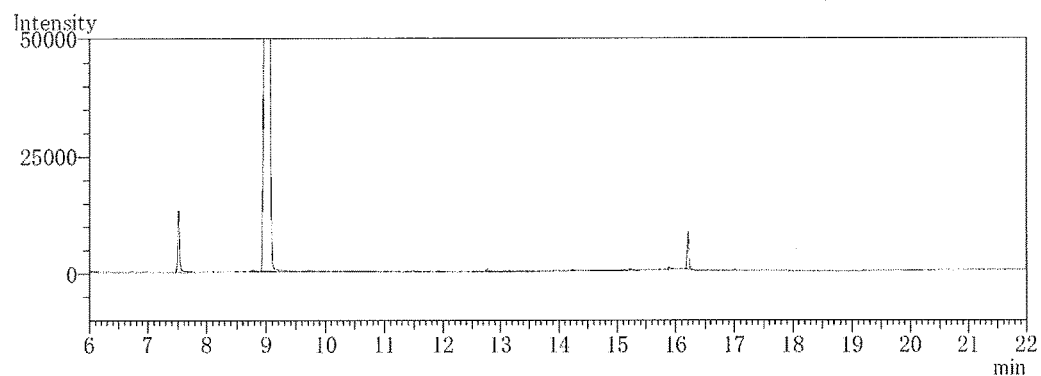
FIG. 1 is a gas chromatogram of a purified cyclohexasilane obtained in Example 1-1.

1. Silicon Hydride (Cyclohexasilane) and Method for Producing the Same 1. 1. Method for Producing Cyclohexasilane The method for producing cyclohexasilane of the present invention is a method for distilling crude cyclohexasilane to obtain purified cyclohexasilane, and in the distillation, the absolute pressure during distillation is set to 2 kPa or less, and the heating temperature of crude cyclohexasilane is set to 25 to 100° C. Whereby, obstruction of the apparatus and suspension of distillation can be avoided, and high purity cyclohexasilane can be obtained with good purification efficiency.

The absolute pressure during distillation is 2 kPa or less, preferably 1 kPa or less, and more preferably 500 Pa or less. When the absolute pressure during distillation is higher than this range, distillation is suspended. Based on the detailed study of the present inventors afterward, it is assumed that the distillation is suspended since cyclohexasilane is ring-opening polymerized during distillation. The lower limit of the pressure in the distillation is not particularly limited so long as it is within the feasible range, but when the pressure is too low (when the degree of vacuum is too high), the amount of evaporation of crude cyclohexasilane may be small, and the restriction of apparatus is also increased, thus the pressure during distillation is preferably 1 Pa or more, more preferably 5 Pa or more, and further preferably 10 Pa or more.

The heating temperature of crude cyclohexasilane is 25 to 100° C., preferably 35° C. or more, more preferably 40° C. or more, further preferably 45° C. or more, and particularly preferably 50° C. or more. Also, the heating temperature is preferably 95° C. or less, more preferably 90° C. or less, and further preferably 85° C. or less. When the heating temperature of crude cyclohexasilane is too low, not only the evaporation rate is low, but also the temperature of a condenser is necessary to be low in order to certainly condense vaporized cyclohexasilane, thus a solidified matter is likely to adhere to the condenser, and the apparatus is likely to be obstructed. Based on the detailed study of the present inventors afterward, this solidified matter is proved to be solidified cyclohexasilane. Here, when the temperature of the condenser is raised to a temperature at which a solidified matter is not produced in the conditions that the heating temperature is too low, the temperature difference between the heating unit and the condensing unit becomes smaller, and the uncondensed cyclohexasilane is increased, and the distillation yield is deteriorated. On the other hand, when the heating temperature of crude cyclohexasilane is too high, distillation is suspended. Based on the detailed study of the present inventors afterward, it is assumed that the distillation is suspended since cyclohexasilane is ring-opening polymerized during distillation. When crude cyclohexasilane is purified by distillation, while the purification efficiency is lowered even though the heating temperature is high or low, purified cyclohexasilane can be efficiently obtained only when the crude cyclohexasilane is distilled in a specific temperature range.

Here, the heating temperature of crude cyclohexasilane refers to a liquid temperature of the crude cyclohexasilane heated to be evaporated during distillation. For example, when evaporation of crude cyclohexasilane is carried out in a pot, "the temperature of the distillation bottom" is the heating temperature, and when using a thin film distillation apparatus or the like, "the temperature of the evaporation surface" is the heating temperature.

As described above, in the method for producing cyclohexasilane of the present invention, the absolute pressure and the heating temperature of crude cyclohexasilane during distillation are controlled in the predetermined ranges, whereby obstruction of the condenser and suspension of distillation are avoided. Alternatively, or in addition, obstruction of the condenser and suspension of distillation can be avoided also by using a specific distillation apparatus suitable for distillation at further low pressure range (for example, a medium vacuum range of $10^2$ Pa to $10^{-1}$ Pa or so to a high vacuum range of $10^{-1}$ Pa to $10^{-5}$ Pa or so), and the purification efficiency of cyclohexasilane can be increased. Such specific distillation apparatus includes a molecular distillation apparatus, a short path distillation apparatus, a thin film distillation apparatus and the like, and is particularly preferably a molecular distillation apparatus or a short path distillation apparatus.

Here, the terms "molecular distillation", "short path distillation" and "thin film distillation" have both a wide and a narrow meaning depending on the period and country, and herein used in the following meaning.

According to the strict definition, molecular distillation refers to distillation that is carried out under high vacuum (for example, $10^{-1}$ Pa to $10^{-5}$ Pa or so) and makes the distance between the evaporation surface and the condensation surface shorter than a mean free path for vapor molecules. Herein, the term "molecular distillation" is used in the meaning of molecular distillation called in the art, more specifically, in the meaning whether or not the distance between the evaporation surface and the condensation surface surpasses the mean free path for vapor molecules, as long as distillation is carried out under high vacuum (for example, $10^{-1}$ Pa to $10^{-5}$ Pa or so). According to the molecular distillation as described above, ideally, all evaporated vapor molecules are condensed in a condenser without crashing into other vapor molecules and a wall until all vapor molecules reach from the evaporation surface to the condensation surface. However, in general, molecular distillation is too high in the degree of vacuum, thus is somewhat difficult to be carried out in a large scale.

On the other hand, short path distillation is carried out under medium vacuum (for example, $10^2$ Pa to $10^{-1}$ Pa or so). A short path distillation apparatus is one which the molecular distillation apparatus somewhat difficult to carry out distillation in a large scale is improved, and is characterized in that the evaporation surface and the condensation surface are disposed face to face in a position close to the level of the mean free path for vapor molecules.

Thin film distillation is carried out under low vacuum to medium vacuum (for example, $3 \times 10^3$ Pa to $10^{-1}$ Pa or so, and preferably $10^3$ Pa to $10^{-1}$ Pa or so), and a thin film distillation apparatus is different from a short path distillation apparatus in that a condenser is disposed outside an evaporator.

In the method for producing cyclohexasilane of the present invention, the absolute pressure during distillation when using a molecular distillation apparatus, a short path distillation apparatus or a thin film distillation apparatus can be properly set in the high vacuum or medium vacuum range described above. Also, the heating temperature of crude cyclohexasilane in the evaporation surface can be properly set in the range described above, and is, for example, preferably 25 to 80° C., more preferably 25 to 70° C., and further preferably 40 to 70° C.

The molecular distillation apparatus, the short path distillation apparatus and the thin film distillation apparatus comprises an evaporator, a condenser, and a pressure reducing means (vacuum pump or the like).

The evaporator comprises an evaporation surface that can contact to an evaporation source material to supply heat. As the evaporator, a thin-film evaporator is preferred. A thin-film evaporator forms a thin film of an evaporation source material on the evaporation surface and supplies heat to evaporate the evaporation source material. Examples of the evaporator comprising an evaporation surface include plate bodies (for example, rectangular plate, circular plate, and the like), cylindrical bodies, bottomed containers and the like, and the surface of a plate body, the inner surface or outer surface of a cylindrical body, the inner surface of a container or the like can be the evaporation surface. From the viewpoint of forming an evaporation source material into a thin film and evaporating the evaporation source material, evaporators such as plate bodies and cylindrical bodies are preferred. Even though an evaporation source material does not reach its boiling point, evaporation of the evaporation source material can be accelerated and the purification efficiency can be increased by forming an evaporation source material into a thin film and evaporating the evaporation source material. Moreover, foaming and boiling of the evaporation source material can be suppressed to suppress the heat history applied to the evaporation source material. When the evaporator is a plate body or a cylindrical body, the evaporator may also comprise a forced means to form a thin film.

As the forced means to form a thin film, for example, a wiper element that operates along the surface of a plate body or the inner surface or outer surface of a cylindrical body, and a forcibly rotating means that can rotate a circular plate or a cylindrical body to generate a centrifugal force and the like can be used. A wiper element or a forcibly rotating means is provided to a plate body or a cylindrical body as a forced means to form a thin film, then a wiped thin film evaporator or a centrifugal thin film evaporator is obtained. Even a plate body or a cylindrical body that does not have a forced means to form a thin film, an evaporation surface is disposed vertically, and an evaporation source material is gradually fallen from the top, then a falling thin film evaporator is obtained. A centrifugal thin film evaporator and a falling thin film evaporator are particularly preferred.

The thickness of a thin film formed on the evaporation surface of a thin-film evaporator should be properly set considering the evaporation rate and the like, and is preferably 10 to 100 μm, more preferably 20 to 90 μm, and further preferably 30 to 80 μm. In addition, the evaporation area is determined depending on the size of the apparatus, thus should be properly selected depending on the amount of the source material to be evaporated.

In the molecular distillation apparatus or the short path distillation apparatus, a condenser is disposed in the inside of the evaporator. In the thin-film distillation apparatus, a condenser is disposed outside the evaporator. In either case, the condenser comprises a condensation surface for getting contact with vapor molecules evaporated by an evaporator, to cool the vapor molecules. In the short path distillation apparatus, the condensation surface of the condenser is disposed facing to the evaporation surface of the evaporator. Also in the molecular distillation apparatus, it is preferred that the evaporation surface and the condensation surface be disposed face to face, but it is not limited thereto, and various dispositions can be taken in a range that can fall under molecular distillation. Examples of the distillation apparatus in which the evaporation surface and the condensation surface are disposed face to face in the apparatus include an apparatus having a double tube structure constituted by an external cylinder and an internal cylinder, in which the inner surface of the external cylinder is an evaporation surface or a condensation surface, and the outer surface of the internal cylinder is an condensation surface or an evaporation surface. When the evaporation surface and the condensation surface are faced each other, it is preferred that the area of the condensation surface be the same or more than the area of the evaporation surface.

In the distillation in the method for producing cyclohexasilane of the present invention, it is preferred that the evaporated cyclohexasilane be condensed at −5° C. to 30° C. Also, the condensation temperature is more preferably −2° C. to 20° C., and further preferably 0° C. to 15° C. Under the range of specific pressure conditions described above, when the condensation temperature is within the above range, cyclohexasilane is not solidified to cause obstruction in the apparatus, and it is possible to maintain good workability.

The molecular distillation apparatus and the short path distillation apparatus are different from the thin film distillation apparatus in the deposition of the condenser as described above. These distillation apparatuses are preferably classified to a centrifugal thin film distillation apparatus, a concentric tube distillation apparatus, a Leybold mixed thin film distillation apparatus, a falling film distillation apparatus, and the like.

Here, the distillation apparatus used in the method for producing cyclohexasilane of the present invention is not particularly limited to the molecular distillation apparatus, the short path distillation apparatus or the thin film distillation apparatus, as long as it comprises an evaporator, a condenser, and a pressure reducing means. For example, a known other distillation apparatus comprising the evaporator, the condenser and the like described above can be used. Also in that case, the thin-film evaporator described above is preferred as an evaporator.

In the present invention, a series of operations on the distillation (specifically, operations from addition of crude cyclohexasilane to takeout of purified cyclohexasilane) is preferably carried out without air exposure. For example, all of a container for crude cyclohexasilane, a distillation apparatus (evaporator, condenser, and the like), and a container for purified cyclohexasilane may be accommodated in an explosion-proof booth, and further, this explosion-proof booth may be controlled under an inert gas atmosphere such as nitrogen, or an air exposure may be prevented in the addition of an unpurified liquid, takeout of a condensate and the like, by pressure-feed with an inert gas such as nitrogen gas, and carrying out distillation in an airtight apparatus.

A method for preparing the crude cyclohexasilane subjected to the distillation is not particularly limited in the present invention, and a known method for synthesizing cyclohexasilane can be properly adopted. For example, a reaction mixture obtained by a method including cyclizing diphenyldichlorosilane as a raw material using an alkali metal, isolating a six-membered ring, bringing the six-membered ring into contact with hydrogen chloride gas in the presence of aluminum chloride to chlorinate silicon and subsequently bringing the obtained halide of cyclohexasilane into contact with a metal hydride such as lithium aluminum hydride to be reduced can be used as crude cyclohexasilane. In addition, a reaction mixture obtained by a method described in the production example set forth below found by the present inventors, more specifically, a method including cyclizing a halosilane compound such as trichlorosilane in the presence of phosphine, and reducing the obtained halide of cyclohexasilane can be used as crude cyclohexasilane.

In the method for producing cyclohexasilane of the present invention, the crude cyclohexasilane is subjected to vacuum distillation at least at 2 k Pa or less, thus it is desired that the content of a component with a low boiling point be small, and it is preferred that a component with a low boiling point such as a solvent and the like be previously removed before subjecting to the distillation according to the present invention. Specifically, for example, the solvent should be distilled away under ordinary pressure to reduced pressure over 2 kPa, or the like.

According to the method for producing cyclohexasilane of the present invention, it is possible to obtain purified cyclohexasilane in a high purification yield, usually 60% or more, preferably 70% or more, more preferably 80% or more, and further preferably 90% or more.

The purified cyclohexasilane obtained by the method for producing cyclohexasilane of the present invention is highly pure, and for example, in the gas chromatography analysis set forth below in examples, has a purity of usually 98% by area or more, preferably 99% by area or more, more preferably 99.5% by area or more, and further preferably 99.9% by area or more.

1. 2. Method for Producing Silicon Hydride Compound

The method for producing a silicon hydride compound of the present invention is a method for producing a silicon hydride compound of formula (1):

$$(SiH_2)_n \tag{1}$$

wherein n is 3 to 6, or a silicon hydride compound of formula (2):

$$Si_mH_{2m+2} \tag{2}$$

wherein m is 3 to 6, and distillation steps with different conditions are carried out at least twice. According to the production method, a high purity silicon hydride with a content of a metal element of 0.01 to 100 ppb can be obtained from a silicon hydride compound containing impurities. The present inventors have studied for the purpose of producing a silicon hydride compound (especially, cyclohexasilane) having further higher purity than the cyclohexasilane obtained by the method for producing cyclohexasilane, in a good yield, and consequently, succeeded in the reduction of the impurities in the obtained silicon hydride compound by carrying out distillation with different conditions at least twice.

The cyclic silane compound represented by the formula (1) includes cyclotrisilane, cyclotetrasilane, cyclopentasilane, silylcyclopentasilane, cyclohexasilane and the like, and the chain silane compound represented by the formula (2) includes trisilane, tetrasilane, isotetrasilane, pentasilane, neopentasilane, isopentasilane, hexasilane and the like. These hydrogens may be substituted with an alkyl group, an aryl group or the like. Among them, the cyclic silane compound is preferred, and particularly, cyclohexasilane that is likely to cause polymerization can suppress production of polymer in the purification step and it is possible to markedly improve the purification yield, by application of the production method of the present invention, and it is likely to take effects of reducing a metal element and improving temporal stability, thus is cited as a preferred cyclic silane compound.

Hereinafter, distillation carried out at least twice in the method for producing a silicon hydride compound of the present invention will be described.

1. 2. 1. First Distillation Step

The silicon hydride compound obtained through the reduction step contains several % to more than 10% of a polymer component of the silicon hydride compound (particularly, a cyclic silane compound), and about several thousand ppm of a metal element derived from a reducing agent or the like, as impurities. Particularly, when the silicon hydride compound is a cyclic silane compound, the polymer component is increased. Therefore, it has been found that, when the silicon hydride compound containing such impurities is suddenly distilled at a high temperature, a polymer of the silicon hydride compound is further increased. This problem has been remarkable in the case of cyclohexasilane. It has been thought that the polymer component of the silicon hydride compound and the metal element contained in the silicon hydride compound as impurities have an action like a polymerization accelerator of accelerating polymerization of a silicon hydride compound, in the distillation under reduced pressure carried out in a distillation tower at a high temperature or the like. Here, the polymer refers to a dimer and a higher multimer of the intended silicon hydride compound.

Therefore, in the method for producing a silicon hydride compound of the present invention, the main purpose is to rapidly remove the impurities (specifically, polymer components) without increasing the amount of the polymer, in the first distillation step. Accordingly, the heating temperature in the first distillation step is preferably carried out at 25 to 80° C. When the heating temperature is too low, not only evaporation rate is low, but also the temperature of a condenser is necessary to be low in order to certainly condense the vaporized silicon hydride compound, thus a solidified silicon hydride compound is likely to adhere to the condenser, and the line is likely to become obstructed. When the temperature of the condenser is raised not to solidify silicon hydride compound, the temperature difference between the evaporator and the condenser becomes smaller, and the uncondensed silicon hydride compound is increased, and the distillation yield is deteriorated. On the other hand, when the heating temperature of the silicon hydride compound is too high, polymerization progresses, and the amount of the polymer is increased in the first distillation step, and the amount of the polymer is also increased in the following second distillation step, thus it is not preferred. The heating temperature in the first distillation step is more preferably 30 to 70° C., further preferably 35 to 65° C., and particularly preferably 40 to 60° C.

The unpurified silicon hydride compound introduced to the first distillation step may be a solution dissolved in a solvent. At this time, the concentration of the unpurified silicon hydride compound in the solution is preferably 50 to 100% by mass, from the viewpoint of distillation efficiency. When a reaction of synthesizing a silicon hydride compound that is a previous step of the distillation is performed in a reaction solvent, the solvent should be previously removed to condense the solution, so as to be in the above concentration range.

The first distillation step is preferably carried out by any one of a short path distillation apparatus, a thin film distillation apparatus, and a molecular distillation apparatus. In the first distillation step, it is important not to increase the amount of the polymer of the silicon hydride compound, thus it is preferred to select a distillation method in a distillation apparatus to which the heat history is unlikely to be applied in a short time, not a distillation in the distillation tower. Regarding the short path distillation apparatus, the thin film distillation apparatus and the molecular distillation apparatus, as described in the section of "1. 1. Method for producing cyclohexasilane", the condensation temperature of the evaporated silicon hydride compound is also preferably in the same range as in "1. 1. Method for producing cyclohexasilane".

In the method for producing a silicon hydride compound of the present invention, the first distillation step is carried out at the absolute pressure of preferably 3 kPa or less, more preferably 1 kPa or less, further preferably 500 Pa or less, and particularly preferably 200 Pa or less. It is because, when the pressure in the first distillation step is too high, the heat history may be applied to the silicon hydride compound to increase the amount of the polymer. The lower limit of the absolute pressure in the first distillation step is not particularly limited, but in the actual operation, is preferably 1 Pa or more, and more preferably 10 Pa or more.

Here, a series of operations on the first distillation step (specifically, operations from addition of unpurified silicon hydride compound to takeout of a condensate of the first distillation) is preferably carried out without air exposure, as the distillation in "1. 1. Method for producing cyclohexasilane".

In the first distillation step, while it also depends on the adopted distillation apparatus and distillation conditions, it is preferred that the polymer component in the condensate of the first distillation be reduced to almost zero, and the metal element be reduced to several to more than 10 ppm or so. The quantification of the polymer component can be performed using $^1$H-NMR, and the quantification of the metal element can be performed using ICP or ICP-MS.

Here, the method for synthesizing an unpurified silicon hydride compound subjected to the first distillation step is not particularly limited.

1. 2. 2. Second Distillation Step

In a second distillation step, it is preferred to carry out distillation under reduced pressure in a known distillation tower. Since the polymer component of the silicon hydride compound considered to accelerate polymerization of the silicon hydride compound is reduced to almost zero, and the metal element is reduced to several to more than 10 ppm or so, according to the first distillation, the polymer component of the silicon hydride compound can be suppressed even carrying out the second distillation step at a temperature higher than in the first distillation step. Accordingly, in the second distillation step, a temperature higher than the heating temperature adopted in the first distillation step is desired, and the second distillation step can be carried out at 50 to 100° C. The heating temperature is more preferably 60 to 90° C. and further preferably 70 to 85° C.

The second distillation step is carried out at the absolute pressure of preferably 5 kPa or less, more preferably 2 kPa or less, further preferably 1 kPa or less, and particularly preferably 200 Pa or less. It is because when the pressure in the second distillation step is too high, the polymer components of the silicon hydride compound may be newly produced in the second distillation step while it has been reduced in the first distillation step. The lower limit of the absolute pressure in the second distillation step is not particularly limited, but in the actual operation, is preferably 5 Pa or more, and more preferably 10 Pa or more.

In the purified silicon hydride compound after the second distillation step, it is preferred that the polymer component of the silicon hydride compound be reduced to zero (N.D.), and the amount of the metal element (total amount) be reduced to 100 ppb or less. The amount of the metal element in the high purity purified silicon hydride compound is more preferably 50 ppb or less, further preferably 20 ppb or less, and particularly preferably 10 ppb or less. The lower limit is most preferably zero (N.D.), but it is technically difficult, thus the lower limit is preferably 0.01 ppb or so. Furthermore, each content of aluminum, sodium, potassium, lithium, iron, calcium, magnesium, titanium, chromium and copper is reduced to preferably 10 ppb or less, more preferably 5 ppb or less, further preferably 2 ppb or less, and particularly preferably 1 ppb or less. The lower limit is most preferably zero (N.D.), but it is technically difficult, thus the lower limit is preferably 0.01 ppb or so. A silicon film formed using a silicon hydride compound that these metal elements are contained more than the above range is not preferred since it has low mobility and thus deterioration of performance is caused when using as a semiconductor. In addition, when the metal element is chromium or copper, it is not particularly preferred.

1. 2. 3. Case where Distillation Step is Carried Out Three Times or More

In the method for producing a silicon hydride compound of the present invention, as described above, the second distillation step is carried out following the first distillation step, whereby the polymer component of the silicon hydride compound in the purified silicon hydride compound can be reduced to zero (N.D.), and the amount of the metal element can be reduced to 100 ppb or less. Thus, it is not necessary to further carry out distillation, but a distillation step carried out in the same conditions as in the first distillation step between the first distillation step and the second distillation step, or an additional distillation step after the second distillation step or the like may be carried out.

1.2.4. Other Purification Method

In addition, as a purification method other than distillation, conventionally known purification method such as washing of the product with water, an organic solvent and a mixed solvent thereof, treatment with an oxidizing agent that brings the product into contact with an oxidizing agent, and purifications such as adsorption purification, reprecipitation, liquid separation and extraction, recrystallization, crystallization and chromatography, may be combined.

1. 3. Cyclohexasilane 1. 3. 1. First Cyclohexasilane

The first cyclohexasilane of the present invention contains pure cyclohexasilane at a rate of 98% by mass or more and 100% by mass or less. The content rate of the pure cyclohexasilane is preferably 99% by mass or more, more preferably 99.5% by mass or more, and further preferably 99.9% by mass or more. Here, in order to obtain the content rate of the pure cyclohexasilane, for example, "% by area" of cyclohexasilane in the gas chromatogram can be used as the content rate of the pure cyclohexasilane. The first cyclohexasilane of the present invention can be preferably obtained by the method for producing cyclohexasilane of the present invention described above, and also can be obtained by the method for producing a silicon hydride compound of the present invention, or a production method combining the method and the method for producing cyclohexasilane of the present invention.

A silicon-containing impurity that can be contained in the first cyclohexasilane of the present invention other than pure cyclohexasilane is not particularly limited, but mainly includes hexasilane ($Si_6H_{14}$), a dimer of cyclohexasilane ($Si_{12}H_{22}$) or ring-opened products thereof (compounds in which one or two rings of a dimer are opened ($Si_{12}H_{24}$, $Si_{12}H_{26}$); herein collectively referred to as "dimers of cyclohexasilane"), siloxane compounds (compounds having a siloxane bond, in which an oxygen atom is added to silicon hydride) and the like. The silicon-containing impurity may be one type or two types or more.

In the preferred embodiment of the first cyclohexasilane of the present invention, hexasilane is contained at a rate of 2% by mass or less, a dimer of cyclohexasilane is contained at a rate of 2% by mass or less, or a siloxane compound is contained at a rate of 2% by mass or less. In other words, when one type or two types or more of the main three types of the silicon-containing impurities described above are contained, each is 2% by mass or less, and the total content is preferably 2% by mass or less. Each content rate of the main three types of the silicon-containing impurities (hexasilane, a dimer of cyclohexasilane, a siloxane compound) is more preferably 1% by mass or less, and further preferably 0.1% by mass or less. The lower limit is most preferably zero (N.D.), but it is technically difficult to set to zero for hexasilane and a dimer of cyclohexasilane, thus the lower limit is preferably 0.0001% by mass or so, more preferably 0.001% by mass or more, or further preferably 0.01% by mass or more. Here, among the main three types of the silicon-containing impurities, it is particularly desirable that the content rate of a dimer of cyclohexasilane is within the above range.

In the second cyclohexasilane of the present invention, the content of a metal element as impurities is 0.01 to 100 ppb (mass base). When the content of a metal element is within this range, production of a polymer of cyclohexasilane is suppressed even when stored for a long period. The second cyclohexasilane of the present invention can be preferably obtained by the method for producing a silicon hydride compound of the present invention described above, and also can be obtained by the method for producing cyclohexasilane of the present invention, or a production method combining the method and the method for producing a silicon hydride compound of the present invention.

The metal element includes aluminum, sodium, potassium, lithium, iron, calcium, magnesium, titanium, chromium, copper, and the like, derived from reducing agents and reaction raw materials, and the like. Among them, cyclohexasilane in which sodium is reduced to 0.01 to 100 ppb is preferred. It is because sodium is a metal element having high mixing possibility regardless of the production method and the steps, and reduction of sodium is industrially useful.

Here, cyclohexasilane that is contaminated with a metal element even in a minute amount can be said as a high purity cyclohexasilane composition, and the content can be also said as the content in a cyclohexasilane composition. Also in the following description, the content of a metal element and the content of polymer have a meaning of "content in a composition".

In the second cyclohexasilane of the present invention, each content of aluminum, sodium, potassium, lithium, iron, calcium, magnesium, titanium, chromium and copper is reduced to preferably 10 ppb or less, more preferably 5 ppb or less, further preferably 2 ppb or less, and particularly preferably 1 ppb or less. The lower limit is most preferably zero (N.D.), but it is technically difficult, thus the lower limit is preferably 0.01 ppb or so.

The second cyclohexasilane of the present invention has a low content of a polymer component. Specifically, in the second cyclohexasilane of the present invention, the content of the polymer component is preferably 0 to 0.5% by mass, more preferably 0 to 0.1% by mass, further preferably 0 to 0.05% by mass, particularly preferably 0 to 0.01% by mass, and most preferably 0 (N.D.).

The second cyclohexasilane of the present invention has a low content of the metal element and the polymer component, and the like, and thus is excellent in storage stability. For example, in a container that is a metal container in which inner wall is coated with a resin material such as a fluorine-based resin, the increase in the polymer when stored under nitrogen atmosphere at 25° C. for 30 days is preferably 0 to 0.5% by mass, more preferably 0 to 0.1% by mass, further preferably 0 to 0.05% by mass, particularly preferably 0 to 0.01% by mass, and most preferably 0 (N.D.) In addition, the content of the polymer itself when stored under nitrogen atmosphere at 25° C. for 30 days is preferably 0 to 0.5% by mass, more preferably 0 to 0.1% by mass, further preferably 0 to 0.05% by mass, particularly preferably 0 to 0.01% by mass, and most preferably 0 (N.D.).

Here, even though it is a silicon hydride compound (the compound represented by the formula (1) or (2) described above) other than cyclohexasilane, if it is one obtained by the method for producing a silicon hydride compound of the present invention, it has a low content of the polymer component as well as the second cyclohexasilane of the present invention, and is excellent in storage stability as well. The content of the polymer component is preferably 0 to 0.5% by mass, more preferably 0 to 0.1% by mass, further preferably 0 to 0.05% by mass, particularly preferably 0 to 0.01% by mass, and most preferably 0 (N.D.).

According to the method for producing a silicon hydride compound of the present invention, it is possible to obtain a purified silicon hydride compound in which a polymer component of the silicon hydride compound is not contained (N.D.), and a metal element (particularly, sodium) is reduced to the range of 0.01 to 100 ppb, in a high purification yield of usually 80% or more, and further preferably 90% or more. Particularly, in cyclohexasilane, when the amount of a metal element is increased, polymerization is likely to progress, and the content of a metal element is within the above range, whereby it is possible to suppress progression of polymerization reaction and stably preserve cyclohexasilane. Moreover, cyclohexasilane is more excellent than a lower order silicon hydride compound, from the viewpoint of rapid growth rate during film forming, and has high usefulness.

The first and second cyclohexasilane of the present invention (cyclohexasilane or a silicon hydride compound obtained by the method for producing cyclohexasilane or method for producing a silicon hydride compound of the present invention) is useful, for example, as a silicon raw material used in solar cells, semiconductors and the like.

2. Method for Storing Silicon Hydride Compound

The silicon hydride compound handled in the storage method of the present invention is represented by the formula (1) or formula (2) described in the section of "1. 2. Method for producing silicon hydride compound". Specific examples of each compound are as described in the section of "1. 2. Method for producing silicon hydride compound". These cyclic silane compounds or chain silane compounds are in the liquid state at ordinary temperature, thus are easily handled.

The method for synthesizing a silicon hydride compound stored in the storage method of the present invention is not particularly limited, and it is particularly preferred that the storage method of the present invention be applied to the silicon hydride compound or cyclohexasilane obtained by the method for producing a silicon hydride compound or method for producing cyclohexasilane of the present invention. According to the storage method of the present invention, it is possible to maintain high purity of the silicon hydride compound or cyclohexasilane obtained by the production method of the present invention.

The silicon hydride compound reacts with oxygen or water to produce a siloxane compound. In addition, a cyclic silane compound sometimes causes ring-opening polymerization by heat and light. Therefore, in the present invention, a silicon hydride compound is stored at 40° C. or less in a storage container in which an inert gas with an oxygen concentration of 100 ppm or less and a moisture amount of 100 ppm or less is enclosed. In a storage temperature exceeding 40° C., ring-opening polymerization of a cyclic silane compound is gradually accelerated, thus the storage temperature is set at 40° C. or less. Here, the lower limit of the storage temperature is not particularly limited. The silicon hydride compound may be cooled to a melting point or less and stored in a solidified state, or may be stored in a liquid state so as to be easily transferred.

In addition, the lower the oxygen concentration and moisture amount in an inert gas, the more preferred it is. When both are 100 ppm or less, it is possible to suppress the lowering of purity after storage at 40° C. or less for 30 days to 1% by mass or less, and it is possible to suppress the production amount of the siloxane compounds after storage at 40° C. or less for 30 days to 1% by mass or less.

The inert gas is a gas that does not react with a silicon hydride compound, and includes nitrogen, argon, helium, neon, krypton, xenon and the like, and nitrogen and argon are preferred.

As the storage container, one having sealability, pressure resistance and light shielding properties is used. As the pressure resistance, it is preferred to have a proof pressure of 0.1 MPa or more. The proof pressure is more preferably of 0.2 MPa or more and further preferably 0.3 MPa or more. The upper limit of the proof pressure is not particularly limited, but is preferably 2.0 MPa or less and more preferably 0.5 MPa or less, from the viewpoint of easy handling of the container.

The storage container and the equipment such as piping set forth below are usually manufactured from stainless steel, but may be formed from a corrosion resistant alloy such as HASTELLOY (registered trademark) or MAT series and MA series manufactured by MMC Superalloy Corporation. For the purpose of improving corrosion resistance in the inside of the storage container and piping, the inside of the storage container and piping made of a metal material may be coated with a resin material such as a fluorine-based resin.

The silicon hydride compound is synthesized, and then purified by distillation or the like, and thereafter, may be directly transferred to the storage container utilizing the piping, or may be once stored in a storing container. During storing, it is preferred that the atmosphere in the storing container be an inert gas with an oxygen concentration of 100 ppm or less and a moisture amount of 100 ppm or less, and the temperature of the silicon hydride compound be set at 40° C. or less.

Figure 2:
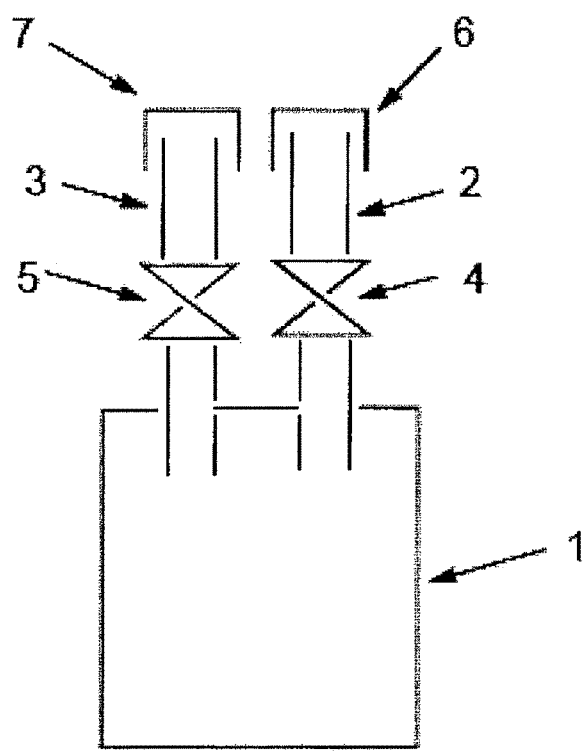
FIG. 2 is a schematic explanatory view of a storage container used in a storing method of the present invention.

It is preferred that, in the storage container, a first valved piping for introducing an inert gas in which the oxygen concentration and the moisture amount are controlled to the predetermined amount to the storage container and a second valved piping for a silicon hydride compound transferred from the storing container in a liquid state be disposed. The schematic cross sectional view of the storage container is shown in FIG. 2. To storage container 1, a first valved piping for introducing an inert gas comprising valve 4 and piping 2 for introducing an inert gas and a second valved piping comprising valve 5 and piping 3 for a silicon hydride compound are connected. The silicon hydride compound is taken in and out from the second valved piping. Here, 6 and 7 are a nozzle. Also, the valve structure is not particularly limited, and any known valves are usable.

Figure 3:
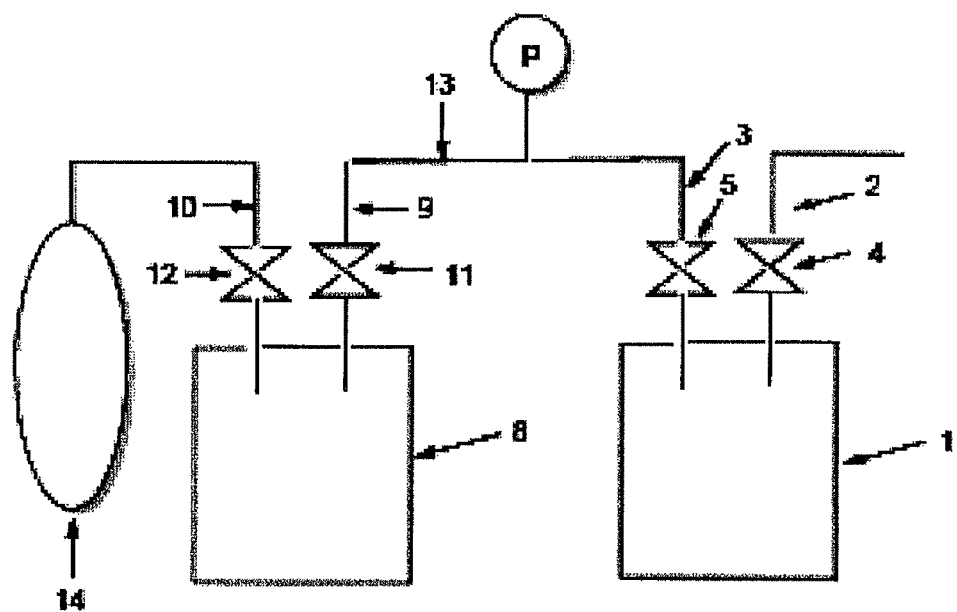
FIG. 3 is a schematic explanatory view for describing a liquid transfer step.

In order to realize a method for transferring a silicon hydride compound from a storing container to a storage container, and storing the silicon hydride compound in the storage container, specifically, for example, a storing container having the same constitution as the storage container is used, as shown in FIG. 3. More specifically, to storing container 8, a valved piping for introducing an inert gas comprising valve 12 and piping 10 and a valved piping for a silicon hydride compound comprising valve 11 and piping 9 are connected. The piping 9 is connected to the piping 3 for a silicon hydride compound of the storage container 1 with liquid transfer piping 13. First, an inert gas in which oxygen and moisture are adjusted to the predetermined amount is introduced from an inert gas cylinder not shown (for example, inert gas cylinder 27 in FIG. 4) to the storage container 1 via the piping 2 and the opened valve 4, to replace atmosphere in the storage container 1 with an inert gas. Subsequently, into the storing container 8 in which a silicon hydride compound is already enclosed together with an inert gas, an inert gas is pressed from inert gas cylinder 14 via the piping 10 and the opened valve 12. Whereby, the pressure in the storing container 8 is increased, thus when the valve 11 for a silicon hydride compound of the storing container 8 and the valve 5 and valve 4 of the storage container 1 are opened, the silicon hydride compound in the storing container 8 is liquid-transferred to the storage container 1 via the pipings 9, 13 and 3, and excess inert gas is exhausted. Moreover, by closing the valves 4 and 5, the silicon hydride compound can be stored under an inert atmosphere.

When liquid transferring the silicon hydride compound, it is preferred to be maintained at 20 to 40° C. so that the silicon hydride compound can maintain the liquid state. At below 20° C., a solidified silicon hydride compound may be mixed, and may cause piping blockage or the like. At above 40° C., a polymer may be produced, and the purity of the silicon hydride compound may be lowered.

When the storage container 1 is detached from the apparatus after transferring the silicon hydride compound to the storage container 1, it is preferred to carry out a cleansing step in advance. It is because, when the silicon hydride compound remained in the piping 3 and valve 5 of the storage container 1 is left after transferred, it may be decomposed or solidified to be an impurity, and the silicon hydride compound containing impurities may be introduced to the storage container 1 at the following transfer. It is also possible, at the stage of completing the transfer of the silicon hydride compound to the storage container 1, to open the valve 5 for a silicon hydride compound and the valve 4 for an inert gas to introduce an inert gas into the storage container 1, and reversely transfer the silicon hydride compound remained in the valve 5, the piping 3 or the like to the storing container 8. However, the silicon hydride compound has low vapor pressure, thus cannot be completely removed only by reverse transfer of an inert gas. Therefore, it is preferred to concurrently carry out a cleansing step using a washing liquid.

Figure 4:
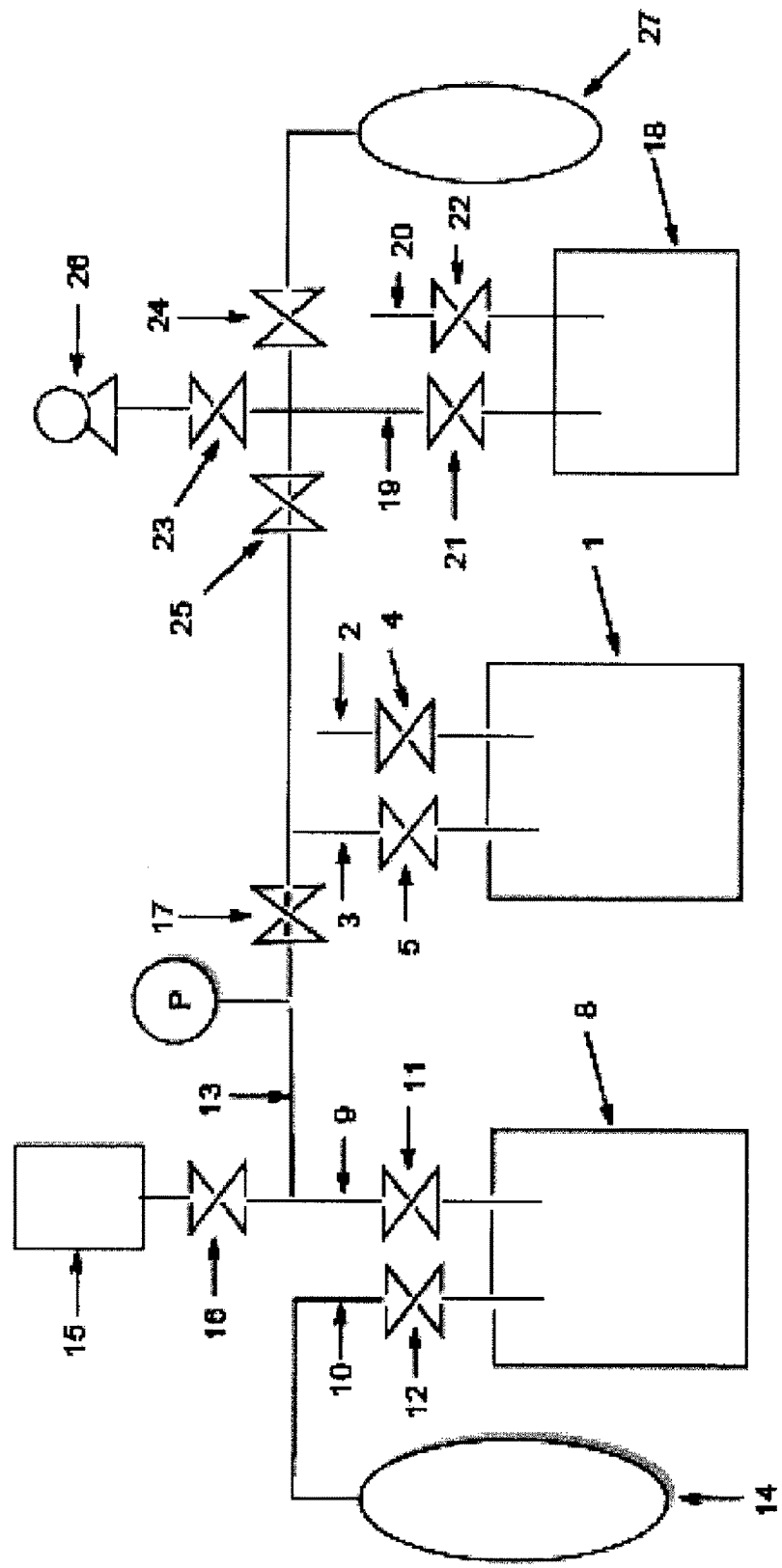
FIG. 4 is a schematic explanatory view of an apparatus carrying out a cleansing step.

In FIG. 4, a schematic explanatory view of an apparatus comprising washing liquid tank 15 and washing liquid recovery container 18 for realizing a cleansing step is shown. In FIG. 4, the piping 2 and the piping 20 are not connected to a main line for exhaustion. To carry out a cleansing step, a washing liquid flows from the washing liquid tank 15 via opened valve 16 and the piping 13, to wash the silicon hydride compound remained in the inner walls of the piping 3 and valve 5, and the liquid after cleansing is recovered into the washing liquid recovery container 18 via the piping 19 and the valve 21. At this time, the valves 4, 5, 11, 12, 23 and 24 are closed. With the valve 16 closed, the valve 23 is opened to remove the liquid remained in the piping under a reduced pressure by a pump 26, then the valve 23 is closed to supply an inert gas from an inert gas cylinder 27 to completely remove the liquid from the piping. Here, the inert gas is exhausted from the piping 20 via the washing liquid recovery container 18 and opened valve 22. Also before the cleansing step, in order to remove the silicon hydride compound remained in the piping 13, an inert gas may flows from the inert gas cylinder 27. After the cleansing step is completed, the washing liquid recovery container 18 is detached from the apparatus. At this time, valve 25 is closed so as to prevent atmosphere from mixing into the pipings of the storing container 8, the storage container 1, and the like. In addition, when the storage container 1 is detached, valve 17 is closed together with the valve 11, to doubly prevent atmosphere from mixing into the storing container 8.

As the solvent that can be used as the washing liquid, aprotic solvents are preferred, and specifically, aromatic hydrocarbons such as toluene, xylene and benzene; aliphatic hydrocarbons such as hexane and octane; saturated cyclic hydrocarbons such as cyclohexane and methyl cyclohexane; esters such as ethyl acetate, butyl acetate and butyl propionate; chain and cyclic ethers such as diethyl ether, diisopropyl ether, methyl tertiary butyl ether, cyclopentyl methyl ether, tetrahydrofuran and 1,4-dioxane; and the like can be used. These can be used alone or in admixture of two or more kinds. Here, as the solvent used as the washing liquid, it is preferred to use one from which oxygen and moisture are previously removed.

3. Method for Cleansing Apparatus for Silicon Hydride Compound

The apparatus handled in the cleansing method of the present invention is an apparatus brought into contact with a silicon hydride compound. The silicon hydride compound referred in the present invention is a compound represented by the formula (1) and/or the formula (2) described in the section of "1. 2. Method for producing silicon hydride compound". Specific examples of the cyclic silane compound represented by the formula (1) and the chain silane compound represented by the formula (2) are as described in the section of "1. 2. Method for producing silicon hydride compound".

Here, the cleansing method of the present invention is particularly preferably applied to an apparatus contacted with a silicon hydride compound obtained by the method for producing a silicon hydride compound of the present invention or cyclohexasilane obtained by the method for producing cyclohexasilane of the present invention. According to the cleansing method of the present invention, it is possible to maintain high purity of the silicon hydride compound or cyclohexasilane obtained by the production method of the present invention.

The silicon hydride compound reacts with oxygen or water to produce a siloxane compound. In addition, a cyclic silane compound causes ring-opening polymerization by heat and light to produce a silicon hydride-based polymer. In order to efficiently remove such impurities from the apparatus, three cleansing steps are carried out in the present invention. Here, the apparatus for a silicon hydride compound referred in the present invention refers to all apparatuses that can contact with a silicon hydride compound, in a series of all industrial steps such as synthesis, purification and storage (preservation), of a silicon hydride compound. Therefore, in the apparatus for a silicon hydride compound, for example, synthesis apparatus, distillation purification apparatus, filtration apparatus, storing container, storage container, pipings connecting these apparatuses, and the like are included. These apparatuses and pipings may be formed by stainless steel, a corrosion resistant alloy or the like, and coated by a resin material, as well as "the storage container and the equipment such as piping" described in the section of "2. Method for storing silicon hydride compound".

3. 1. First Cleansing Step

In the first cleansing step, an apparatus is washed using an aprotic solvent. Whereby, the silicon hydride compound adhered to the apparatus is dissolved in the aprotic solvent to be washed away. In addition, the siloxane compound and the silicon hydride polymer remained in the apparatus are not dissolved in the aprotic solvent, but can be physically washed away in the first cleansing step. As the aprotic solvent that can be used, those same as "the solvent that can be used as the washing liquid" described in the section of "2. Method for storing silicon hydride compound" can be used alone or in admixture of two or more kinds.

The cleansing method is not particularly limited, and a known cleansing method for an apparatus used in synthesis and preservation of a compound can be properly adopted. For example, in the case of a synthesis apparatus, there is a method for sending a reaction product to the next step, then putting a recovery line, filling an aprotic solvent in a reaction container, then recovering the aprotic solvent from the recovery line, and the like. Also, an apparatus is disassembled, and then can be washed by pouring, immersed in, washed by wiping with an aprotic solvent, or the like. When washed by pouring, an aprotic solvent may be sprayed together with an inert gas to enhance a cleansing effect, and when filling a solvent in the apparatus or when immersing the apparatus in a solvent, ultrasonic vibration may be applied. It is also possible to perform cleansing by combining different cleansing methods.

The atmosphere during cleansing is preferably an environment reduced in the oxygen concentration, for preventing the danger of ignition when pyrophoric silane gas is generated during cleansing operation. In such environment, the atmosphere is not particularly limited, but, it is preferred to carry out cleansing, for example, in a nitrogen atmosphere of an oxygen concentration of 0.1% by volume or less as the atmosphere contacted to a washed surface.

The number of times of cleansing is not particularly limited, and may be once, but is preferably 2 to 50 times or so, in order to obtain sufficient cleansing effects. The cleansing temperature is not also particularly limited, and is preferably 0 to 70° C., more preferably 0 to 50° C., and further preferably 10 to 30° C. The amount of the aprotic solvent used in cleansing is preferably 0.1 to 10.0 L/m$^2$ or so, more preferably 0.2 to 5.0 L/m$^2$ or so, and further preferably 0.2 to 2.0 L/m$^2$ or so, as the amount used per the washed area.

3. 2. Second Cleansing Step

In the second cleansing step, the apparatus washed in the first cleansing step is washed using a solution containing an alkaline compound in an alcohol. This step modifies the silicon hydride compound that could not be removed in the first cleansing step into a safe siloxane compound, and also this siloxane compound is dissolved in alkali, thus the silicon hydride compound can be removed in this step.

As the alkaline compound, one or more types selected from the group consisting of hydroxides, acetates, phosphates, borates and carbonates of alkali metals, and hydroxides, acetates, phosphates, borates and carbonates of alkaline earth metals are preferred. Among them, from the viewpoint of cleansing effects and modification effects, the alkaline compound is preferably an alkali metal compound, more preferably a hydrate of an alkali metal, and most preferably KOH.

The alcohol is not particularly limited, and may be any of an aliphatic alcohol, an alicyclic alcohol and an aromatic alcohol, and may be a monoalcohol or a polyhydric alcohol. Among them, aliphatic monoalcohols having 1 to 12 carbon atoms are preferred, and include methanol, ethanol, propanol, isopropanol, n-butanol, isobutanol, sec-butanol, t-butanol, 1-pentanol, 2-pentanol, 3-pentanol, cyclopentanol, 1-hexanol, 2-hexanol, 3-hexanol, 1-heptanol, 2-heptanol, 3-heptanol, 1-octanol, isooctanol, 2-ethyl hexanol, isononyl alcohol, lauryl alcohol, and the like. These alcohols may have a substituent such as an alkyl group. These may be used alone or in admixture of two or more kinds.

In the solution containing an alkaline compound in an alcohol used in the second cleansing step, the amount of the alkaline compound is preferably 1 to 50 parts by mass, based on 100 parts by mass of the alcohol. When the amount is below 1 part by mass, cleansing effects and modification effects are not sufficiently exhibited, and when the amount exceeds 50 parts by mass, progression of modification reaction may be too fast to control.

In addition, water may be contained in the solution containing an alkaline compound in an alcohol. There is an effect of enhancing the solubility of the alkaline compound in an alcohol by adding water. The amount of water is preferably 1 to 70 parts by mass, based on 100 parts by mass of the alcohol. When the amount is 1 part by mass or more, the solubility of the alkaline compound tends to increase. However, when the amount is more than 70 parts by mass, a siloxane compound may be difficult to be dissolved in the solution containing an alkaline compound in an alcohol.

Cleansing method, atmosphere during cleansing, the number of times of cleansing, cleansing temperature, the amount of washing liquid used and the like are the same as in the first cleansing step.

3. 3. Third Cleansing Step

The third cleansing step is carried out after the first cleansing step and the second cleansing step, and is a step of removing the impurities and fine particles remained in the apparatus. In addition, the solution containing an alkaline compound in an alcohol used in the second cleansing step is also washed away.

The washing liquid in the third cleansing step is water having an electric conductivity at 25° C. of 1 μS/cm or less. The electric conductivity is preferably 0.5 μS/cm or less, more preferably 0.1 μS/cm or less, and further preferably 0.06 μS/cm or less. The lower the lower limit of the electric conductivity, the more preferred it is, but considering the difficulty of acquisition and the like, a lower limit of about 0.056 μS/cm or more is sufficient. Here, the electric conductivity can be measured, for example, by a commercially available electrical conductivity meter, but when an ultrapure water producing apparatus is equipped with an electrical conductivity meter, the electric conductivity can be confirmed by its value.

Cleansing method, the number of times of cleansing, cleansing temperature, the amount of washing liquid used and the like are the same as in the first cleansing step. The third cleansing step should be carried out in a clean room of class 1000.

3. 4. Drying Step

After the third cleansing step, a drying step of drying an apparatus for a silicon hydride compound may be carried out. The drying step can be carried out by using a dryer, or spraying chemical clean inert gas (for example, nitrogen or the like).

3. 5. Apparatus for Silicon Hydride Compound

The apparatus for a silicon hydride compound washed by the method of the present invention is highly cleaned, thus preferably used as a container for storing the high purity silicon hydride compound after purification. This container for storage (it is not limited to a container for storage, and may be any apparatus for a silicon hydride compound as long as it can hold water) has properties that, even though water having an electric conductivity at 25° C. of 1 μS/cm or less used as a washing liquid in the third cleansing step is added thereto and left at 25° C. for 1 hour, the increase of the halogen ions in water is 100 ppb by mass or less, the increase of the metal element (for example, sodium, calcium, aluminum, nickel, chromium, zinc, potassium, and the like) is 50 ppb by mass or less, and the increase in the number of particles with a particle size of 0.5 μm or more is 100 particles/mL or less. More specifically, water before adding to the container is hardly contaminated even after added to the container. The increase in halogen ions is preferably 50 ppb by mass or less, and more preferably 30 ppb by mass or less. In addition, the increase of the metal element is preferably 30 ppb by mass or less, and more preferably 10 ppb by mass or less. Moreover, the increase in the number of particles with a particle size of 0.5 μm or more is preferably 50 particles/mL or less and more preferably 10 particles/mL or less. Here, a method of quantifying the halogen ions and metal element, and a method for determining the number of particles with a particle size of 0.5 μm or more are set forth below in examples.

The apparatus for a silicon hydride compound washed by the method of the present invention is highly cleaned as described above, thus even though a silicon hydride compound is stored, the silicon hydride compound is not adversely affected by impurities, and the purity is not largely lowered. For example, among the apparatuses for a silicon hydride compound, even though the air inside the container for storage is set to a nitrogen atmosphere, then a silicon hydride compound is added thereto and the container is sealed and left at 25° C. for 30 days, the lowering of purity is 0.5% by mass or less. Here, it is preferred that the oxygen concentration in a nitrogen atmosphere be set to 1 ppm or less (volume base), and the dew point be set to −70° C. or less. It is because the presence of oxygen and moisture leads to the lowering of purity.

4. Method for Treating Exhaust Gas

The method for treating an exhaust gas of the present invention is characterized in that, in exhausting a gas produced in a facility that handles a cyclic silane compound or a silicon hydride compound of formula (2):

$$Si_mH_{2m+2} \quad (2)$$

wherein m is 3 to 6, (hereinafter may be referred to as "handled silane compound"), one or more silane components selected from the group consisting of $SiH_4$, $Si_2H_6$, $Si_3H_8$, $Si_4H_{10}$, $Si_5H_{12}$, $Si_6H_{14}$ and cyclic silane compound in the gas are detoxified.

The cyclic silane compound in the present invention includes, other than cyclic silicon hydride compounds represented by following general formula (1):

$$(SiH_2)_n \quad (1)$$

wherein n is an integer of 5 to 10, cyclic halogenated silane compounds and cyclic oraganosilane compounds in which all or some of hydrogen atoms of cyclic silicon hydride compounds are replaced by a halogen atom or an organic group.

On the other hand, the cyclic silane compound represented by the formula (2) is the same as the chain silane compound represented by the formula (2) as described in the section of "1. 2. Method for producing silicon hydride compound", and specific examples thereof are as described in the section of "1. 2. Method for producing silicon hydride compound".

As the handled silane compound, cyclopentasilane and/or cyclohexasilane are preferred, from the viewpoint of allowing the method for treating an exhaust gas of the present invention work more effectively. It is particularly preferred to use a silicon hydride compound obtained by the method for producing a silicon hydride compound of the present invention or cyclohexasilane obtained by the method for producing cyclohexasilane of the present invention as the handled compound.

In the present invention, examples of the facility that handles the cyclic silane compound or the silicon hydride compound of the formula (2) include synthesis facilities to synthesize and produce a cyclic silane compound or the like, purification facilities to carry out distillation, recrystallization and reprecipitation for the purpose of high-purification of a cyclic silane compound or the like, filling facilities (in-line liquid transfer facilities, glove boxes, and the like) to fill, transport or store a cyclic silane compound or the like, evaluation facilities to perform physical property evaluation or material evaluation of a cyclic silane compound or the like, processing facilities using a cyclic silane compound or the like as a raw material (a CVD apparatus or coating apparatus for forming a film, reaction apparatus to polymerize a cyclic silane compound or the like), and the like. These facilities are usually maintained under an inert gas atmosphere, so as not to bring a cyclic silane compound or the like into contact with atmosphere, and preferably the moisture amount and the oxygen amount are strictly controlled.

The gas exhausted from a facility that handles the cyclic silane compound or the silicon hydride compound represented by the formula (2) (hereinafter may be referred to as "gas to be treated") contains one or more silane components selected from the group consisting of $SiH_4$, $Si_2H_6$, $Si_3H_8$, $Si_4H_{10}$, $Si_5H_{12}$, $Si_6H_{14}$ and cyclic silane compounds, while it also depends on the type of the handled silane compound. Here, $SiH_4$, $Si_2H_6$, $Si_3H_8$, $Si_4H_{10}$, $Si_5H_{12}$ and $Si_6H_{14}$ (hereinafter may be collectively referred to as "low order silane components") are mainly generated as a by-product in a synthesis facility, and generated as a degradation product of the silane compound (the cyclic silane compound or the silicon hydride compound represented by the formula (2)) handled in a synthesis facility, a purification facility, an evaluation facility, a processing facility, and the like. The cyclic silane compound is mainly contained in an exhaust gas by vaporization of the cyclic silane compound itself in a purification facility, a filling facility, an evaluation facility and a processing facility, or contained in an exhaust gas by exhaust of the cyclic silane compound used as a raw material in a processing facility in an unreacted (unused) state.

In addition, the gas to be treated may contain, for example, a halogenated silane compound such as hexachlorodisilane, tetrachlorosilane, dichlorosilane or trichlorosilane. For example, when a halogenated silane compound is used together with a cyclic silane compound as a raw material of film forming with a CVD apparatus, an unreacted halogenated silane compound may be contained in an exhaust gas. The present invention decomposes and detoxifies at least the silane component (low order silane component and cyclic silane compound), and also decomposes and detoxifies the halogenated silane compound.

In the method for treating an exhaust gas of the present invention, it is preferred that a decomposition step of subjecting the gas to be treated to combustion treatment and/or adsorption treatment to a metal oxide material be included. In this decomposition step, by the combustion treatment and/or adsorption treatment to a metal oxide material, at least a silane component among components to be detoxified (silane components, halogenated silane compounds) is decomposed to $SiO_2$ and $H_2O$. For example, a monosilane is decomposed as in the following formula. Of course, in the decomposition step, other components to be detoxified (halogenated silane compounds) are also decomposed.

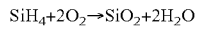

The combustion treatment is a treatment of supplying the gas to be treated and oxygen or air into a combustion apparatus, and burning the components to be detoxified (silane components, halogenated silane compounds) in the presence of a fuel, as necessary. By this combustion treatment, solid $SiO_2$ and water vapor ($H_2O$) are produced. The produced $SiO_2$ may be separated from gas using a filter or the like in the combustion apparatus, or may be pressure-fed to the alkali treatment step set forth below by air, an inert gas or the like, together with the water vapor. The combustion temperature in the combustion treatment varies depending on the type of the component to be detoxified, and for example, when the component to be detoxified is cyclopentasilane or cyclohexasilane, the combustion temperature is preferably 400 to 2000° C., and more preferably 700 to 2000° C. Also, for example, when a halogenated silane compound is contained as the component to be detoxified, the combustion temperature is preferably 200 to 1500° C., and more preferably 500 to 1500° C. As the combustion apparatus, a known incinerator can be used. As the fuel, for example, 12A, 13A (A mixed gas of hydrocarbon gas such as methane and ethane (so called natural gas) and LPG), LPG gas (liquefied petroleum gas), COG (gas obtained when coal is carbonized in a coke oven) and hydrogen gas can be used.

Here, when the concentration of the components to be detoxified (silane components, halogenated silane compounds) contained in the gas to be treated is high, the gas to be treated is in danger of igniting and exploding in the combustion treatment. Thus, it is desirable that the gas to be treated subjected to the combustion treatment is diluted with an inert gas or the like so that the concentration of the components to be detoxified is a predetermined concentration (explosion limit) or less.

The adsorption treatment is a treatment of supplying the gas to be treated to an adsorption apparatus filled with a metal oxide material to cause oxidation reaction on the metal oxide material. By this adsorption treatment, solid $SiO_2$ and water vapor ($H_2O$) are produced and most of the produced $SiO_2$ is fixed on the metal oxide material. As the metal oxide constituting the metal oxide material, for example, copper oxide (CuO), aluminum oxide ($Al_2O_3$), magnesium oxide (MgO) and the like can be used. The metal oxide material preferably has a porous structure and is further preferably particulate, from the viewpoint of treatment efficiency. As the adsorption apparatus, for example, a known adsorption treatment apparatus equipped with an adsorption tower filled with the metal oxide material can be used. The conditions in the adsorption treatment may be properly set, and for example, the treatment temperature is preferably 60 to 400° C., and more preferably 100 to 250° C. When the treatment temperature is lower than 60° C., silane (Si) is unlikely to act on the metal oxide material as an adsorbent and the treatment efficiency tends to lower. On the other hand, when the treatment temperature is higher than 400° C., energy loss is increased, and the pore structure of the adsorbent may be destroyed.

In the method for treating an exhaust gas of the present invention, it is preferred to carry out an alkali treatment step before and/or after the decomposition step. When the gas to be treated is subjected to the alkali treatment step before the decomposition step, a part of the components to be detoxified (silane components, halogenated silane compounds) can be previously decomposed (for example, decomposed to $SiO_2$ and $H_2O$), and the treatment efficiency can be increased. On the other hand, when the gas to be treated is subjected to the alkali treatment step after the decomposition step, $SiO_2$ produced in the decomposition step can be dissolved and removed by alkali. The alkali treatment step may be carried out both before and after the decomposition step, or may be carried out either one of before and after the decomposition step. The alkali treatment step is preferred to be carried out at least after the decomposition step, and particularly when the decomposition step is carried out by a combustion treatment, it is preferred to be subsequently subjected to the alkali treatment step.

In the alkali treatment step, specifically, a gas to be treated (may contain solid $SiO_2$) is brought into contact with an alkaline solution. The alkali treatment exhibits an action capable of dissolving and removing $SiO_2$, and also exerts an action of decomposing the components to be detoxified (silane components, halogenated silane compounds) to $SiO_2$ and $H_2O$. The alkali is not particularly limited, and sodium hydroxide, potassium hydroxide, calcium hydroxide, sodium carbonate, potassium carbonate, calcium carbonate and the like can be used. As the solvent, water and a mixed solution of water and alcohol in an arbitrary ratio can be used. As the alcohol, methanol, ethanol, propanol, isopropanol, butanol, isobutanol, tertially butanol and the like can be used. The alkali treatment is preferably carried out with a scrubber. The scrubber is a gas-liquid contact apparatus that brings a component contained in gas into contact with a liquid (alkaline solution or the like) to be absorbed in the liquid, and a known scrubber can be used in the present invention.

Furthermore, in the method for treating an exhaust gas of the present invention, it is preferred to contain a dehydration step after the decomposition step. The dehydration step is a step of removing water vapor produced in the decomposition step from an exhaust gas. When the alkali treatment step described above is carried out after the decomposition step, it is preferred to carry out the dehydration step after the alkali treatment step. The specific treatment in the dehydration step is not particularly limited as long as it can remove water vapor, and for example, a known method such as deep cooling, physical adsorption by a filter, or adsorption to an organic material or an inorganic material, should be adopted.

The detoxified gas passed through each step described above, is exhausted into the atmosphere by a known exhaust apparatus. At this time, the concentration of the silane component in the detoxified gas is preferably 5 ppm by volume or less, and more preferably 0.5 ppm by volume or less. When a halogenated silane compound is also contained as the component to be detoxified in the gas to be treated, the total concentration of the components to be detoxified (silane components, halogenated silane compounds) in the detoxified gas is preferably within the above range.

This application claims the benefits of priority based on Japanese Patent Application No. 2012-281489, filed on Dec. 25, 2012, and priority based on Japanese Patent Application No. 2013-185100, filed on Sep. 6, 2013. The entire content of the specification of Japanese Patent Application No. 2012-281489, filed on Dec. 25, 2012, and that of the specification of Japanese Patent Application No. 2013-185100, filed on Sep. 6, 2013, are incorporated into this application by reference.

EXAMPLES

The present invention will be more specifically described below with reference to examples, but the present invention is not limited to the following examples, and can be implemented with appropriate modifications within the scope conforming to the purport of what is mentioned above and below herein. All of such modifications are included in the technical scope of the present invention.

Here, various analyses in each of the examples and comparative examples described below were performed by the methods described below.

1. Purity of Cyclohexasilane and Detection of Siloxane Compound

The purity (yield) of cyclohexasilane and the detection of siloxane compound in each of the examples and comparative examples were obtained by performing a gas chromatography analysis under the following conditions, using a sample diluted to 2% by mass with super dehydrated hexane in a glove box under a nitrogen atmosphere, by a gas chromatography apparatus ("GC2014" manufactured by SHIMADZU CORPORATION) equipped with a capillary column ("DB-1MS" manufactured by J&W Scientific, Inc.; 0.25 mm×50 m).

Carrier gas: $N_2$
Sample injection temperature: 300° C.
Detector temperature: 300° C.
Sample injection amount:
Column temperature: 50 to 300° C.

2. Amount of Metal Component

The amount of metal component in Production Examples, Example 1-4 and Reference Example 1-1 was measured by ICP-MS ("Agilent 7700S" manufactured by Agilent Technologies) in the state diluted by 500-fold with 5% by mass dilute nitric acid.

3. Content of Particles with Particle Size of 0.5 μm or More

Each content of particles with a particle size of 0.5 μm or more in Example 3-1 to 3-2 and Comparative Examples 3-1 to 3-3 was obtained by determining the number of particles with a particle size of 0.5 van or more by a particle counter ("AZ-SO2/LS-200" manufactured by Particle Measuring Systems (PMS), Inc.) utilizing laser light scattering.

4. Quantification of Halogen Ions

Quantification of halogen ions in Example 3-1 to 3-2 and Comparative Examples 3-1 to 3-3 was performed using ion chromatography (manufactured by Japan Dionex Co., Ltd.; "ISC-3000").

5. Quantification of Metal Elements

Quantification of a metal element in Example 3-1 to 3-2 and Comparative Examples 3-1 to 3-3 was performed using ICP-MS (high frequency emission mass spectrometer; manufactured by Agilent Technologies; "Agilent 7700").

Production Example (Production of Crude Cyclohexasilane)

The inside of a 300-mL four-necked flask equipped with a thermometer, a condenser, a dropping funnel and a stirrer was replaced with nitrogen gas, and thereafter 5.81 g (0.022 mol) of triphenylphosphine as a phosphine, 17.2 g (0.133 mol) of diisopropylethylamine as a basic compound and 100 mL of 1,2-dichloroethane as a solvent were charged therein. Subsequently, while stirring the solution in the flask, 18.0 g (0.133 mol) of trichlorosilane as a halosilane compound was slowly added dropwise from the dropping funnel in the condition of 25° C. After the completion of dropwise addition, the mixture was reacted by keeping stirring for 2 hours, and subsequently heating and stirring at 60° C. for 8 hours. The resulting reaction liquid was concentrated and washed to obtain a nonionic dodecachlorocyclohexasilane-containing compound ($[Ph_3P]_2[Si_6Cl_{12}]$) as a white solid.

2.44 g of the resulting white solid (2.18 mmol of dodecachlorocyclohexasilane-containing compound) was charged in a 100-mL two-necked flask equipped with a dropping funnel and a stirrer, and was dried under reduced pressure. Then, the inside of the flask was replaced with argon gas, and 30 mL of cyclopentyl methyl ether was added as a solvent. Subsequently, while stirring the suspension in the flask, 10 mL of a solution of lithium aluminum hydride in diethyl ether (concentration: about 1.0 mol/L) was gradually added dropwise as a reducing agent from the dropping funnel in the condition of −20° C., and then the reaction was carried out by stirring the mixture at −20° C. for 5 hours. After the reaction, the reaction solution was filtered under a nitrogen gas atmosphere, to remove the produced salt. The solvent was distilled away from the obtained filtrate under reduced pressure, to obtain a colorless transparent liquid of crude cyclohexasilane.

The amount of the polymer and the amount of the metal element in the resulting unpurified crude cyclohexasilane were shown in Table 1. In Table 1, % is % by mass, and ppm and ppb are both mass base.

The presence of the polymer of cyclohexasilane was determined by whether or not a broad peak was observed at 3 to 4 ppm (TMS standard) in deuterated benzene, using $^1$H-NMR ("Unity plus 400" manufactured by Varian Medical Systems, Inc.), and when observed, the polymer of cyclohexasilane was quantified from the integral ratio of the peaks (same as in Reference Example 1-1).

Example 1-1

The crude cyclohexasilane obtained in the production example was distilled using a general vacuum distillation apparatus made of glass (pot, fractionating column, condenser (cooling pipe), receiver), at an absolute pressure of 300 Pa, a temperature of the evaporation surface (temperature of the crude cyclohexasilane in the pot) of 75° C., and a temperature of the condensation surface (set temperature of the condenser) of 5° C., to obtain purified cyclohexasilane. During distillation, in the apparatus including the condenser, solidification of the cyclohexasilane was not found.

When the resulting purified cyclohexasilane was analyzed by gas chromatography, cyclohexasilane, hexasilane and a dimer of cyclohexasilane were detected at a rate of 98.9% by area, 0.6% by area and 0.5% by area, respectively, and a siloxane compound was not detected. Also, the distillation yield was 90%.

Example 1-2

The crude cyclohexasilane obtained in the production example was distilled using a short path distillation apparatus ("KDL-01" manufactured by Pfintech Inc.), at an absolute pressure of 20 Pa, a temperature of the evaporation surface of 45° C., and a temperature of the condensation surface of 0° C., to obtain purified cyclohexasilane. During distillation, in the apparatus containing the condenser, solidification of the cyclohexasilane was not found.

When the resulting purified cyclohexasilane was analyzed by gas chromatography, cyclohexasilane, hexasilane and a dimer of cyclohexasilane were detected at a rate of 99.1% by area, 0.4% by area and 0.5% by area, respectively, and a siloxane compound was not detected. Also, the distillation yield was 96%.

Example 1-3

The crude cyclohexasilane obtained in the production example was distilled using a short path distillation apparatus ("KDL-01" manufactured by Pfintech Inc.), at an absolute pressure of 100 Pa, a temperature of the evaporation surface of 60° C., and a temperature of the condensation surface of 0° C., to obtain purified cyclohexasilane. During distillation, in the apparatus containing the condenser, solidification of the cyclohexasilane was not found.

When the resulting purified cyclohexasilane was analyzed by gas chromatography, cyclohexasilane, hexasilane and a dimer of cyclohexasilane were detected at a rate of 99.0% by area, 0.5% by area and 0.5% by area, respectively, and a siloxane compound was not detected. Also, the distillation yield was 93%.

Comparative Example 1-1

The crude cyclohexasilane was distilled in the same manner as in Example 1-1, except for changing the absolute pressure in the distillation from 300 Pa to 3 kPa, and changing the temperature of the evaporation surface from 75° C. to 130° C., to obtain purified cyclohexasilane. During distillation, the solidified cyclohexasilane adhered to the condenser, thus, after completing the distillation, the adhered cyclohexasilane was also recovered as purified cyclohexasilane by warming the condenser.

When the resulting purified cyclohexasilane was analyzed by gas chromatography, cyclohexasilane, hexasilane and a dimer of cyclohexasilane were detected at a rate of 95.2% by area, 2.1% by area and 2.7% by area, respectively, and a siloxane compound was not detected. Also, the distillation yield was 42%.

Example 1-4

A first distillation step of the crude cyclohexasilane obtained in the production example was carried out, using a short path distillation apparatus (manufactured by German UIC GmbH, KDL 1 type) obtained from Pfintech Inc. The evaporation area of the KDL 1 type short path distillation apparatus was 0.017 m². The first distillation step was carried out at an absolute pressure of 100 Pa, a heating temperature of 40° C., and a temperature of the condenser of 5° C. In addition, the feed rate of the crude cyclohexasilane was set at 1.5 g/min.

The yield in the first distillation step was 94%, and the amount of the polymer and the amount of the metal element in the resulting cyclohexasilane were shown in Table 1.

Subsequently, a second distillation step was carried out using the cyclohexasilane obtained in the first distillation step. The second distillation step was carried out, using a general vacuum distillation apparatus made of glass (recovery flask, connection pipe, distillation connection pipe (trifurcated), cooling pipe, receiver), at an absolute pressure of 800 Pa, a heating temperature of 80° C., and a temperature of the condenser of 5° C. The yield in the second distillation step was 95% by mass, and the total yield of the first and second distillation steps was 89% by mass. The amount of the polymer and the amount of the metal element in the resulting purified cyclohexasilane were shown in Table 1.

In addition, the resulting purified cyclohexasilane was stored under nitrogen atmosphere at 25° C. for 30 days. When the presence of a polymer component in cyclohexasilane after storage was checked, a polymer component was not found.

Reference Example 1-1

The crude cyclohexasilane obtained in the production example was distilled, using the same vacuum distillation apparatus in the same distillation conditions as in the second distillation step, without carrying out the first distillation step. The resulting distillation yield was 70%. The amount of the metal element in the resulting purified cyclohexasilane was shown in Table 1. In addition, when the purified cyclohexasilane was stored for 30 days as in Example 1-4, it was confirmed that 2% by mass of the polymer component was produced. In order to maintain the high purity of the silicon hydride compound also during long-term storage, it was found that the amount of the metal element needs to be highly reduced.

TABLE 1

| | | Amount of the polymer | (Unit) | Amount of the metal element | | | | | | | | | | | Amount of the polymer after 30 days |
|---|---|---|---|---|---|---|---|---|---|---|---|---|---|---|---|
| | | | | Al | Na | K | Li | Fe | Ca | Mg | Ti | Cr | Cu | Total | |
| Production Example | Unpurified | 5% | ppm | 900 | 400 | 200 | 200 | 30 | 10 | 2 | 1 | 1 | 1 | 1745 | — |
| Example 1-4 | After the first distillation | 0% | ppb | 1000 | 600 | 300 | 4 | 600 | 700 | 110 | 60 | 20 | 80 | 3474 | — |
| | After the second distillation | 0% | ppb | 3 | 6 | 7 | 1 | 6 | 9 | 2 | 7 | 1 | 1 | 43 | 0% |
| Reference Example 1-1 | After the distillation | 0% | ppb | 150 | 300 | 400 | 10 | 300 | 600 | 200 | 40 | 30 | 30 | 2060 | 2% |

Example 2-1

The purified cyclohexasilane with a purity of 98.9% by mass obtained in Example 1-1 was stored in the storing container 8 shown in FIG. 3. When stored, the inside of the storing container 8 was previously nitrogen-substituted by nitrogen gas with an oxygen concentration of 10 ppm and a water amount of 10 ppm, and the temperature was maintained at 25° C.

As the storage container of the purified cyclohexasilane, a stainless steel light shielding storage container having a proof pressure of 0.2 MPa was prepared. The constitution of the storage container was as shown in FIG. 2 and FIG. 3. With the valve 4 for an inert gas and the valve 5 for a silicon hydride compound opened, a nitrogen gas with an oxygen concentration of 10 ppm and a water amount of 10 ppm was supplied to the storage container 1 via the piping 3, and the inside of the storage container 1 was nitrogen-substituted. Subsequently, an inert gas was pressed from the inert gas (nitrogen) cylinder 14 into the storing container 8 via the piping 10 and the opened valve 12. Next, the valve 11 for a silicon hydride compound of the storing container 8 and the valve 5 and the valve 4 of the storage container 1 were opened, the cyclohexasilane in the storing container 8 was liquid-transferred to the storage container 1 via the pipings 9, 13 and 3 at 25° C., and the valves 4 and 5 were closed. The transfer rate was 10 cm³/sec. The temperature of the storage container 1 was kept at 25° C.

After storing for 30 days, the purity of the cyclohexasilane in the storage container 1 was determined and found to be 98.8% by mass, and a siloxane compound was not observed.

Comparative Example 2-1

Cyclohexasilane was stored in the same manner as in Example 2-1, except setting the temperature in the liquid transfer at 50° C. and maintaining the temperature of the storage container 1 at 50° C. After storing at 50° C. for 30 days, the purity of the cyclohexasilane in the container was determined and found to be lowered to 93.2% by mass.

Comparative Example 2-2

Cyclohexasilane was stored in the same manner as in Example 2-1, except for setting the oxygen concentration in a nitrogen gas introduced to the storage container 1 at 1000 ppm. The purity in the container after storing for 30 days was determined and found to be lowered to 95.5% by mass, and it was confirmed that 2.0% by mass of a siloxane compound was produced.

Example 2-2

Cyclohexasilane was liquid-transferred to the storage container 1 in the same manner as in Example 2-1. Using the apparatus shown in FIG. 4, with the valves 4 and 5 of the storage container 1 closed, a nitrogen gas flowed at a rate of 5 L/min. Subsequently, with the valves 11, 23 and 24 closed, hexane was passed from the washing liquid tank 15 as a washing liquid through the liquid transfer piping 13, the cyclohexasilane remained in the inner walls of the silicon hydride compound piping 3 and valve 5 was washed, and the liquid after cleansing was recovered into the washing liquid recovery container 18 via the piping 19. The washing liquid remained in the piping was removed under a reduced pressure by pump 26, then a nitrogen gas was supplied from the nitrogen gas cylinder 27 to blow nitrogen, whereby the remained cyclohexasilane was completely removed. After the cleansing step was completed, the storage container 1 was detached from the cleansing apparatus. The purity of cyclohexasilane in the storage container 1 was determined and found to be 98.9% by mass, and it was found that the lowering of purity was not occurred. In addition, inside the piping 3 and valve 5, the presence of a foreign matter could not be visually confirmed.

Comparative Example 2-3

Cyclohexasilane was introduced to the storage container 1, and the container was detached from the apparatus in the same manner as in Example 2-2, except for abbreviating the cleansing step using hexane. As a result, a white solid was adhered to the inner walls of the piping 3 and valve 5. It could be confirmed that this white solid was a siloxane compound produced by hydrolysis of the remained cyclohexasilane.

Example 3-1

The purified cyclohexasilane with a purity of 98.9% by mass obtained in Example 1-1 and a 100-mL container made of SUS 316L as a storage container for cyclohexasilane were prepared. In a glove box under a nitrogen atmosphere, the storage container was filled with cyclohexasilane and left for 24 hours, then cyclohexasilane was taken out from the container, and the container was dried.

Hexane was prepared, and in the simple glove box under a nitrogen atmosphere of an oxygen concentration of 0.1% by volume or less, the storage container was washed by pouring, to carry out the first cleansing step. Cleansing was carried out by pouring 30 ml three times.

A washing liquid having a composition of 80% by mass of isopropanol, 15% by mass of water and 5% by mass of potassium hydroxide was prepared, and in the simple glove box under a nitrogen atmosphere of an oxygen concentration of 0.1% by volume or less, the storage container after the first cleansing step was washed by pouring the washing liquid. Cleansing was carried out by pouring 30 ml five times, and then the storage container was filled with the washing liquid, to be washed by immersion for 1 hour (the second cleansing step). After 1 hour, the washing liquid was discarded.

Using an ultrapure water producing apparatus (manufactured by Millipore Corporation; "Milli-Q Element A-10"), water for the third cleansing step was prepared. The electric conductivity of the resulting water (ultrapure water) was 0.055 µS/cm at 25° C., according to the electrical conductivity meter built in the apparatus. Also, the content of particles with a particle size of 0.5 µm or more was 2 particles/mL. The storage container for cyclohexasilane washed in the second cleansing step was washed by pouring the ultrapure water in a clean room of class 1000. Cleansing was carried out by pouring 30 ml ten times.

Thereafter, drying was carried out in a clean, oven of class 100 at 60° C. for 24 hours.

The storage container subjected to the third cleansing step and the drying step was filled with ultrapure water and sealed, then left for 1 hour. The increase of the halogen ions was 20 ppb by mass, the increase of the metal element was 5 ppb, and the increase in the number of particles with a particle size of 0.5 µm or more was 3 particles/mL, as compared to the ultrapure water before filled.

Example 3-2

In a glove box under a nitrogen atmosphere of an oxygen concentration of 1 ppm or less (volume base), adjusted to a dew point of −70° C. or less, the cyclohexasilane with a purity of 98.9% by mass obtained on Example 1-1 was filled in the container cleaned via the cleansing step and the drying step in the same manner as in Example 3-1, and the purity after 30 days was determined. The lowering of purity was 0.1% by mass or less.

Comparative Example 3-1

Wash test evaluation was carried out in the same manner as in Example 3-1, except that KOH was not used in the second cleansing step, in Example 3-1. After filling ultrapure water in the washed container and leaving it for 1 hour, the increase of the halogen ions was 720 ppb by mass, the increase of the metal element was 1000 ppb by mass, and the increase in the number of particles with a particle size of 0.5 µm was 400 particles/mL. In addition, when inside the container was visually confirmed, a white solid matter was adhered thereto, thus it was obviously the shortage of cleansing.

Comparative Example 3-2

Wash test evaluation was carried out in the same manner as in Example 3-1, except for using a washing liquid of 90% by mass of water and 10% by mass of KOH, in place of the washing liquid of the second cleansing step in Example 3-1. After filling ultrapure water in the washed container and leaving it for 1 hour, the increase of the halogen ions was 70 ppb by mass, the increase of the metal element was 50 ppb by mass, and the increase in the number of particles with a particle size of 0.5 μm was 300 particles/mL.

Comparative Example 3-3

Cyclohexasilane was filled in the same manner as in Example 3-2, except for using a container obtained via the cleansing step and the drying step in the same manner as in Comparative Example 3-2, and the purity after 30 days was determined, then a lowering of purity was 1.2% by mass.

Example 4-1

An exhaust gas from a film-forming facility (CVD apparatus) using cyclohexasilane as a raw material was used as a gas to be treated, and this gas was subjected to a decomposition step by a combustion treatment, an alkali treatment step and a dehydration step, in this order. In the gas to be treated before treatment, $SiH_4$ and the vaporized cyclohexasilane were contained, and the total concentration was 10000 ppm by volume.

In detail, the gas to be treated was firstly introduced to the combustion apparatus together with a fuel (LPG) and oxygen and burned at 1000° C., thereby decomposing low order silane component and cyclohexasilane in the gas to be treated into $SiO_2$ and $H_2O$ (decomposition step). Next, the gas to be treated containing $SiO_2$ and $H_2O$ produced in the decomposition step was pressure-fed to a scrubber with nitrogen gas, and brought into contact with an aqueous alkaline (potassium hydroxide) solution in the scrubber to dissolve $SiO_2$ in the gas to be treated (alkali treatment step). Subsequently, a water vapor-containing gas to be treated passed through the alkali treatment step was pressure-fed to a dehydration apparatus, to remove moisture (dehydration step). Since the total concentration of the low order silane component and cyclohexasilane in the gas to be treated passed through the dehydration step was 0.3 ppm by volume, the gas to be treated passed through the dehydration step was exhausted into the atmosphere.

Example 4-2

An exhaust gas from a film-forming facility (CVD apparatus) using cyclohexasilane as a raw material was used as a gas to be treated, and this gas was subjected to a decomposition step by a adsorption treatment, an alkali treatment step and a dehydration step, in this order. In the gas to be treated before treatment, $SiH_4$ and the vaporized cyclohexasilane were contained, and the total concentration was 10000 ppm by volume.

In detail, the gas to be treated was firstly introduced to the adsorption apparatus filled with a metal oxide material made of copper oxide, and an oxidation reaction was progressed at 220° C., thereby decomposing low order silane component and cyclohexasilane in the gas to be treated into $SiO_2$ and $H_2O$ (decomposition step). Most of the $SiO_2$ produced at this time was fixed to the surface of the metal oxide material. Next, the gas to be treated containing $H_2O$ and a part of $SiO_2$ produced in the decomposition step was pressure-fed to a scrubber with nitrogen gas, and brought into contact with an aqueous alkaline (potassium hydroxide) solution in the scrubber to dissolve $SiO_2$ in the gas to be treated (alkali treatment step). Subsequently, a water vapor-containing gas to be treated passed through the alkali treatment step was pressure-fed to a dehydration apparatus, to remove moisture (dehydration step). Since the total concentration of the low order silane component and cyclohexasilane in the gas to be treated passed through the dehydration step was 0.5 ppm by volume, the gas to be treated passed through the dehydration step was exhausted into the atmosphere.

Reference Example 4-1

An exhaust gas from a film-forming facility (CVD apparatus) using cyclohexasilane as a raw material was used as a gas to be treated, and this gas was subjected to an alkali treatment step. In the gas to be treated before treatment, $SiH_4$ and the vaporized cyclohexasilane were contained, and the total concentration was 10000 ppm by volume.

In detail, the gas to be treated was introduced to a scrubber, and brought into contact with an aqueous alkaline (potassium hydroxide) solution in the scrubber (alkali treatment step). At this time, a part of the low order silane component and cyclohexasilane in the gas to be treated was decomposed into $SiO_2$ and $H_2O$, and the produced $SiO_2$ was dissolved, but the total concentration of the low order silane component and cyclohexasilane in the gas to be treated passed through the alkali treatment step was 500 ppm by volume.

According to the present invention, it is possible to produce (purify) high purity silicon hydride (particularly, cyclohexasilane) suitably utilized as a silicon raw material in applications to solar cells, semiconductors and the like, stably store for a long period, and further highly clean an apparatus for a silicon hydride compound after synthesizing and storing the silicon hydride compound with high efficiency, and suppress mixing and generation of impurities and fine particles when the silicon hydride compound is synthesized and stored next time.

1 Storage container
2 Inert gas piping
3 Silicon hydride compound piping
4, 5, 11, 12, 16, 17, 21, 22, 23, 24, 25 Valves
8 Storing container
9, 10, 19, 20 Pipes
13 Liquid transfer piping
14, 27 Inert gas (nitrogen) cylinders
15 Washing liquid tank
18 Washing liquid recovery tank
26 Pump

The invention claimed is:

1. Cyclohexasilane comprising pure cyclohexasilane at a rate of 98% by mass or more and less than 100% by mass, comprising hexasilane and a dimer of cyclohexasilane at a rate of 0.0001% by mass or more and 2% by mass or less.

2. Cyclohexasilane in which the content of a metal element is 0.01 to 100 ppb.

3. Cyclohexasilane in which the content of sodium is 0.01 to 100 ppb.

4. Cyclohexasilane in which the content of chromium is 0.01 to 10 ppb.

5. Cyclohexasilane in which the content of potassium is 0.01 to 10 ppb.

6. The cyclohexasilane according to claim 2, wherein the content of the polymer component is 0 to 0.5% by mass.

7. The cyclohexasilane according to claim 2, wherein the increase in the polymer when stored under nitrogen atmosphere at 25° C. for 30 days is 0 to 0.5% by mass in a container that is a metal container in which inner wall is coated with a resin material.

8. Cyclohexasilane comprising pure cyclohexasilane at a rate of 98% by mass or more and less than 100% by mass, and further comprising hexasilane at a rate of 0.0001% by mass or more and 2% by mass or less.

* * * * *